United States Patent
Patki et al.

(10) Patent No.: US 12,189,558 B2
(45) Date of Patent: Jan. 7, 2025

(54) DYNAMIC SKEW REALIGNMENT OVER MULTIPLE TRANSMISSION LANES IN INTEGRATED COMPUTING PLATFORMS

(71) Applicant: NVIDIA CORPORATION, Santa Clara, CA (US)

(72) Inventors: Padmanabham Patki, Santa Clara, CA (US); Nisha Bhushan, Milpitas, CA (US); Kiran Kumar Dash, Bangalore (IN); Arpit Gupta, Gurgaon (IN); Chung-Hong Lai, Banciao District (TW); Michael Alan Ditty, Los Gatos, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 235 days.

(21) Appl. No.: 17/812,985

(22) Filed: Jul. 15, 2022

(65) Prior Publication Data
US 2024/0020255 A1  Jan. 18, 2024

(51) Int. Cl.
*G06F 13/38* (2006.01)

(52) U.S. Cl.
CPC .......... *G06F 13/38* (2013.01); *G06F 2213/40* (2013.01)

(58) Field of Classification Search
CPC ..... G06F 1/10; G06F 1/12; G06F 1/08; G06F 13/38; G06F 2213/40
USPC ........................................................ 713/503
See application file for complete search history.

(56) References Cited

U.S. PATENT DOCUMENTS

| | | | | |
|---|---|---|---|---|
| 7,225,354 B2 * | 5/2007 | Tseng | .................... | G06F 13/385 713/503 |
| 7,570,659 B2 * | 8/2009 | Susnow | .................. | H04L 25/14 370/465 |
| 7,631,118 B2 * | 12/2009 | Renaud | .................... | H04L 49/90 710/33 |
| 8,385,374 B1 * | 2/2013 | Wohlgemuth | .......... | H04L 25/14 370/464 |
| 8,909,068 B2 * | 12/2014 | Stojanovic | ........... | H04B 10/614 398/208 |
| 9,929,928 B1 * | 3/2018 | Dekoos | ................. | H04L 41/147 |
| 10,445,265 B2 * | 10/2019 | Lawson | .................... | G06F 1/10 |
| 10,530,379 B1 * | 1/2020 | Vaz | .......... | H03M 1/46 |
| 10,956,124 B2 * | 3/2021 | Schnizler | ................ | H04L 25/14 |

(Continued)

OTHER PUBLICATIONS

"PCI Express Multi-lane De-skew logic design using embedded SERDES FPGA", by Won-ok Kwon, Hyuk-je Kwon, and Kyoung Park; Dated 2004, 4 Pages (Year: 2004).*

*Primary Examiner* — Brian T Misiura
(74) *Attorney, Agent, or Firm* — Maschoff Brennan

(57) ABSTRACT

In various examples, methods may include receiving first data transmitted from a second component and second data transmitted from the second component during a first time period. The first data may be transmitted via a first data lane and the second data may be transmitted via a second data lane. The method may include receiving de-skew symbols at an interval from the second component via the first data lane and via the second data lane during the first time period. The method may include compensating for a first skew introduced to a first propagation of the first data across the first data lane and a second skew introduced to a second propagation of the second data across the second data lane using the de-skew symbols received during the first time period.

18 Claims, 10 Drawing Sheets

(56) References Cited

U.S. PATENT DOCUMENTS

| | | | |
|---|---|---|---|
| 2013/0169328 A1* | 7/2013 | Shibasaki | H03L 7/0812 |
| | | | 327/156 |
| 2015/0012774 A1* | 1/2015 | Maeda | G06F 11/0793 |
| | | | 714/5.1 |
| 2015/0229440 A1* | 8/2015 | Bansal | H04L 65/70 |
| | | | 714/776 |
| 2020/0319666 A1* | 10/2020 | Yang | G06F 1/08 |
| 2023/0133314 A1* | 5/2023 | Wang | H04L 1/0045 |
| | | | 714/776 |

* cited by examiner

DYNAMIC SKEW REALIGNMENT OVER MULTIPLE TRANSMISSION LANES IN INTEGRATED COMPUTING PLATFORMS

BACKGROUND

Transmissions between two or more electrical components may be accomplished using serial communications in which data is communicated over multiple transmission lanes. In some circumstances the propagation time of the data over different lanes may differ and vary based on one or more external stimuli that may change according to changes in the environmental factors. Such changes in propagation time may result in a timing "skew" between when data is received and is expected to be received.

SUMMARY

Embodiments of the present disclosure relate to dynamic skew realignment for serial communications. Systems and methods are disclosed that relate to compensating for skew introduced in a transmission lane of a serial communication system by one or more external stimuli. The compensation may be dynamic in that it may account for changes in the skew that may occur as the external stimuli change.

BRIEF DESCRIPTION OF THE DRAWINGS

The present systems and methods for dynamic skew realignment for serial communications are described in detail below with reference to the attached drawing figures, wherein.

DETAILED DESCRIPTION

Figure 1:
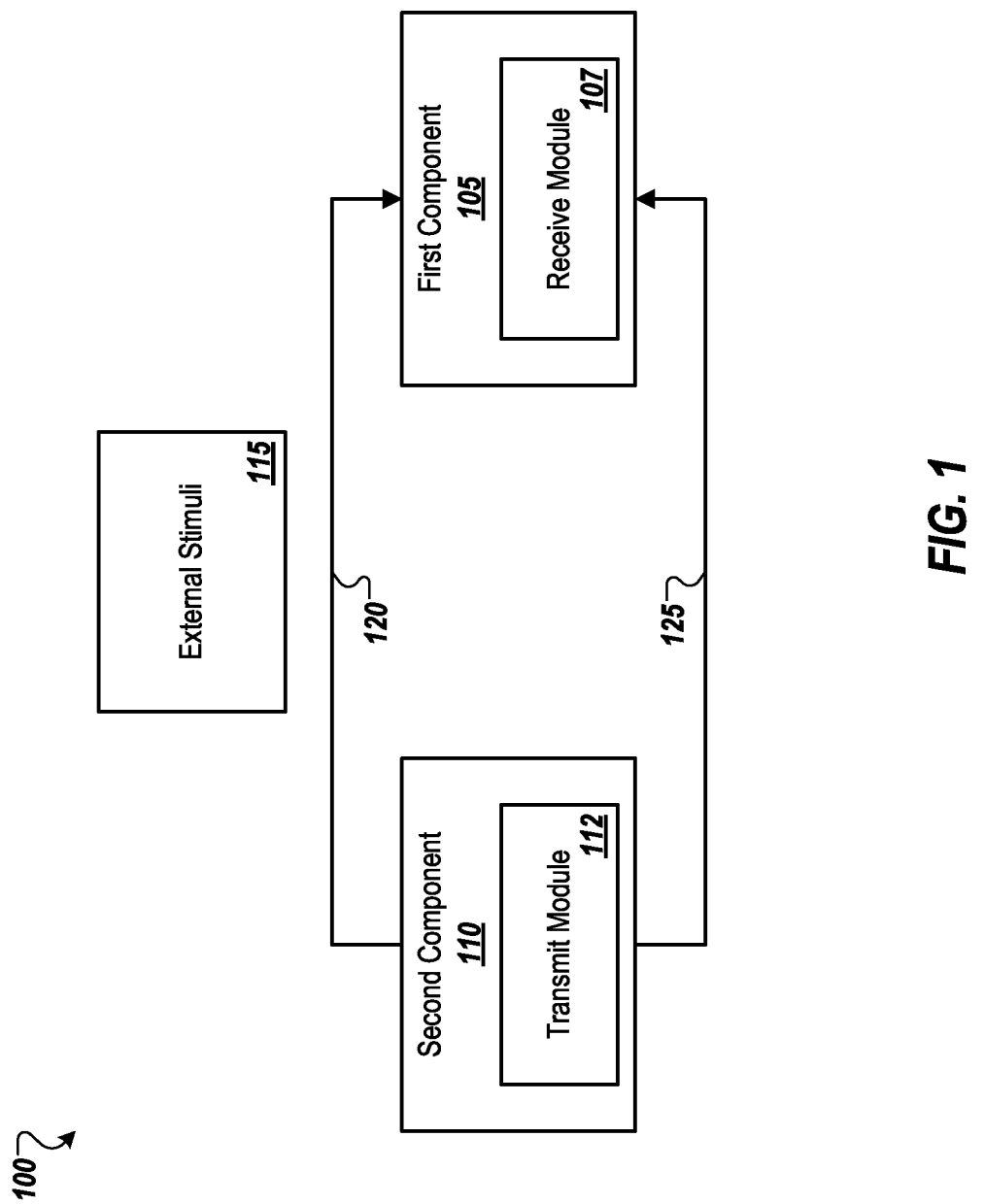
FIG. 1 illustrates an example system configured to perform compensation operations with respect to skew introduced to a propagation of transmitted data, according to one or more embodiments of the present disclosure.

Serial communication includes the process of transmitting information or data one bit at a time between components of an electronic system. In the present disclosure, serial communication may include communications between the components of the electronic system, a component that is sending information may be referred to as a "transmit module" or a "transmitter," and a component that is receiving information may be referred to as a "receive module" or a "receiver." In some circumstances, serial communications may include multiple lanes, each lane transmitting serially and temporally offset from one another, such that data to be transmitted may be divided up and transmitted using multi-lane serial communication. For example, a first bit of data may be transmitted on a first lane at time t, a second bit of data may be transmitted on a second lane at time t+n, and a third bit of data may be transmitted on the first lane at time t+m. In the example, both the first lane and the second lane may transmit bits of data serially, and the data to be transmitted may be divided up between the lanes such that the data transmitted on a lane may be received in the order it was transmitted. Multi-lane serial communications may provide improved throughput between the transmitter and the receiver by supporting more transmission lanes than serial communications with a single lane. Serial communications, including multi-lane serial communications, may be employed in any transmission setting that includes data transmissions between a transmitter and a receiver.

For example, obtaining data (e.g., such as operational data, system data, fault data, etc.) from a system on a chip (SoC) may include various transmitter, receiver, and/or transceiver components configured to communicate the data between the SoC and another device (e.g., a system analyzer configured to monitor the operations performed by the SoC). In some instances, multi-lane serial communications may be employed to communicate the data at a relatively fast rate and may use hardware logic which may operate without active software managed communication to reduce interruptions to the operation of the SoC. For example, data to be transmitted from the SoC may be split up and transmitted using multi-lane serial communications, such that each lane of the multiple lanes may include a portion of the data to be transmitted.

In some circumstances, data to be transmitted using multi-lane serial communications may include a transmission configuration assigned by the transmitter and the data may be received by a receiver according to the transmission configuration. For example, the transmitter may assign a transmission window and a transmission lane for each portion of the data (e.g., bits, packets, and/or the like) and the receiver may receive each portion of the data according to the transmission window and transmission lane assigned by the transmitter. In some circumstances, the propagation times of data between one or more lanes of the multiple lanes may differ. The propagation times between the multiple lanes may be affected by physical differences in the multiple lanes (e.g., different lengths, orientations, physical medium, etc.) and/or external stimuli. External stimuli may include uneven temperature sources, noise sources, the passage of time (e.g., component degradation over time, component changes over time, etc.), and/or the like.

In some circumstances, the differences in propagation times of the data between the multiple lanes may cause a skew in a propagation of the data in which the received data may differ from the transmission configuration of the transmitted data. For example, a first portion of data may be expected by the receiver during a first transmission window and due to an introduced skew, which may cause a delay to the first portion of data, the receiver may not obtain the first portion of data when attempting to sample the first portion of data during the expected first transmission window. In some circumstances, the skew of the propagation of the data across the multiple lanes that may be attributable to the physical differences in the multiple lanes may be compensated for during an initial transmission configuration between the transmitter and the receiver.

However, in some instances, the external stimuli may change after the initial skew compensation such that in some circumstances, the skew of the propagation of the data that may be attributable to the external stimuli may change and accordingly may cause the receiver to mistime sampling the skewed data such that the skewed data may not be received by the receiver. In some circumstances, failure to receive a portion of data due to skew of the propagation of the data may cause data to be lost and/or a period of downtime in communications between the transmitter and the receiver.

For example, data to be transmitted by the transmitter may be split into a first portion and a second portion and transmitted over a first lane and a second lane, respectively. The first portion may include a first transmission window and the second portion may include a second transmission window, where the first transmission window may be separated from the second transmission window by a first transmission spacing, k, where k may be measured in microseconds. The transmitter and the receiver may have initially been synchronized such that the receiver may be configured to sample for the first portion during the first expected transmission window and sample for the second portion during the second expected transmission window. During transmission of the first portion and the second portion, the second lane may be subject to external stimuli which may vary the propagation time of the transmission of the second portion and may introduce a skew to the propagation of the second portion. Upon reception at the receiver, the first portion may be separated from the second portion by a second transmission spacing, which may be k+$\Delta$, where $\Delta$ is the skew that may be attributable to the external stimuli. In instances in which the skew is greater than a threshold, the receiver may mistime sampling the received data which may cause the transmitted data to be lost and/or a period of downtime in the communications between the transmitter and the receiver.

In some embodiments of the present disclosure, operations may relate to compensating for skew of a propagation of transmitted data across lanes of a serial communication system. The operations may include periodically transmitting de-skew symbols during the transmission of the data to remove skew that may be introduced in the propagation of the transmitted data by the external stimuli. In some embodiments, the de-skew symbols may be transmitted at a frequency such that an amount of skew introduced in the propagation of the transmitted data may remain under a threshold. In instances in which the transmission of the de-skew symbols causes the amount of skew associated with the propagation of the transmitted data to remain below the threshold, the transmitted data may be received and sampled by the receiver such that the transmitted data may be obtained, and the transmitter and the receiver may remain communicatively coupled.

In some embodiments, the de-skew symbols may be prepared within the transmitter at a physical layer and/or link layer of the open systems interconnection (OSI) model of the transmitter to include physical layer control identifiers and/or link layer control identifiers, such that upon reception of the de-skew symbols by the receiver, the de-skew symbols may be processed at the physical layer and/or link layer of the receiver. Transmitted data may not include the physical layer control identifiers and/or link layer control identifiers such that upon reception of the transmitted data by the receiver, the transmitted data may first be processed by the physical layer and/or link layer and then passed to at least a subsequent layer for additional processing.

In some circumstances, it may be desirable to obtain data from systems (e.g., a SoC) that may operate in harsh environments. For example, systems that may operate in harsh environments may include operating in various vehicles including automobiles, airplanes, marine vehicles, spacecraft, rovers, drones, etc. A specific example of such a system may include one or more computing systems of an autonomous vehicle such as that described below with respect to FIGS. 5A-5D of the present disclosure. It may be desirable to obtain information or data from the system during testing operations that may emulate the harsh environment, which may provide insight into the performance of the system. One method of obtaining data may include serial communications from the system including using more than one serial transmission lane from the system.

In some circumstances, it may be beneficial to test the performance of a system that includes one or more electronic components in a simulated harsh environment. Simulated harsh environments may include extreme temperatures (e.g., heat from an operating vehicle and/or operating environment), noisy environments (e.g., many competing signals, poor communication channels, etc.) and/or other simulated environmental factors and conditions where the performance of the electronic components and/or the electrical communications may be compromised. The simulated harsh environments may cause one or more issues with the performance of the electronic components. Alternatively, or additionally, the simulated harsh environments may cause compromises in communications between the electronic components, which communications may include data that may be associated with the performance of the electronic components (e.g., data used to monitor the performance of the electrical components). In some embodiments of the present disclosure, systems and methods may be configured to compensate for the compromises in data communication (e.g., skew as described above) that may be introduced to communications between electronic components in a simulated harsh environment. Testing systems and the gathering of performance data (e.g., data indicating operations being made) in simulated harsh environments may contribute to the performance and/or safety of the system during use in actual operations by being able to identify and/or correct performance deficiencies. For example, the system may be an autonomous vehicle, or a component or system thereof configured to perform autonomous operations, and the testing and gathering of information related to the performance of the system in a harsh environment may be used to help ensure that the system operates in a predicted and safe manner while operating in real-world situations.

Other examples of systems that may implement one or more operations of the present disclosure may include automotive systems (e.g., a control system for an autonomous or semi-autonomous machine, a perception system for an autonomous or semi-autonomous machine), non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Further, reference in the present disclosure to an "autonomous vehicle" includes any vehicle that has the capability to perform some sort of maneuvering operation (e.g., turning, braking, accelerating, etc.) without direct control by an operator. As such, reference to "autonomous vehicles" is not limited to fully autonomous vehicles, and may include semi-autonomous vehicles (e.g., vehicles implementing one or more advanced driver assistance system (ADAS) functions). Further, many references included in the descriptions given are given in the context of vehicles. However, such a description is not meant to be limiting such that one or more concepts, systems, methods, operations, etc. described in the present disclosure with respect to a "vehicle" or "vehicles" may also apply to one or more different types of systems or machines where applicable.

Referring now to the figures, FIG. 1 illustrates an example system 100 configured to perform compensation operations with respect to skew introduced to the propagation of transmitted data, according to one or more embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. The system 100 may include similar features, functionality, and/or components as those of example autonomous machine 500 of FIGS. 5A-5D, example computing device 600 of FIG. 6, and/or example data center 700 of FIG. 7.

The system 100 may include a first component 105, a second component 110, and external stimuli 115. The first component 105 may include a receive module 107. The second component 110 may include a transmit module 112. A first data lane 120 and a second data lane 125 may communicatively couple the first component 105 and the second component 110. Although two data lanes are explicitly mentioned and described, the system 100 may include any number of data lanes between the first component 105 and the second component 110. Further, in some embodiments, the first component 105 may also include a transmit module and/or the second component 110 may include a receive module.

In some embodiments, the second component 110 may include any system and/or device that may generate data. For example, the second component 110 may include a processor, a system on a chip (SoC), a microcontroller, and/or the like. In some embodiments, it may be desirable to obtain the generated data of the second component 110. For example, the generated data generated of the second component 110 may be transmitted to another system and/or device. In some embodiments, the second component 110 may include the transmit module 112, which may be configured to perform at least the transmissions of the generated data to another system and/or device. Generally, the transmit module 112 may include code and routines configured to enable a computing system to perform one or more operations. Alternatively, or additionally, the transmit module 112 may be implemented using hardware including a processor, a microprocessor (e.g., to perform or control performance of one or more operations), a field-programmable gate array (FPGA), an application-specific integrated circuit (ASIC), and/or other hardware. In some other instances, the transmit module 112 may be implemented using a combination of hardware and software. In the present disclosure, operations described as being performed by the transmit module 112 may include operations that the transmit module 112 may direct a corresponding system to perform. In some embodiments, the second component 110 may include a data storage or a data buffer (not illustrated) which may be configured to store at least a portion of the generated data, as further described herein.

In some embodiments, the second component 110 may include one or more communication interfaces that may be used in transmitting generated data to another system and/or device, such as the first component 105. The communication interfaces may include a wired or a wireless interface. For example, the second component 110 may be communicatively coupled to the first component 105 via at least the first data lane 120 and/or the second data lane 125. In some embodiments, the first data lane 120 and/or the second data lane 125 each may include a transmission medium over which serial communications may be communicated. For example, the transmit module 112 may be configured to transmit the generated data of the second component 110 serially via the first data lane 120 and/or the second data lane 125. The transmission medium may include a wired communication medium and/or a wireless communication medium. For example, in general, the first data lane 120 and/or the second data lane 125 may include a wired transmission line, a wireless transmission channel, and/or combinations of wired transmission lines and wireless transmission channels.

In some embodiments, the first data lane 120 and/or the second data lane 125 may be configured to support simplex communications in which data is transmitted in one direction. For example, the first data lane 120 and/or the second data lane 125 may be configured to support transmissions from the transmit module 112 to the receive module 107. Alternatively, or additionally, the first data lane 120 and/or the second data lane 125 may be configured to support duplex communications in which data may be communicated in two complementary directions. For example, the first data lane 120 and/or the second data lane 125 may be configured to support transmissions from the transmit module 112 to the receive module 107 and support transmissions from the receive module 107 to the transmit module 112. An example of a transmission from the receive module 107 to the transmit module 112 may include an interval adjustment associated with the transmit module 112 and transmitted data, as further described herein.

In some embodiments, the first component 105 may include any system and/or device that may receive and/or process received data. For example, the first component 105 may include a data analysis device that may be configured to receive data and perform one or more operations to the received data. In some embodiments, the receive module 107 of the first component 105 may be configured to obtain the transmitted data from the transmit module 112 of the second component 110. Generally, the receive module 107 may include code and routines configured to enable a computing system to perform one or more operations. Alternatively, or additionally, the receive module 107 may be implemented using hardware including a processor, a microprocessor (e.g., to perform or control performance of one or more operations), a field-programmable gate array (FPGA), an application-specific integrated circuit (ASIC), and/or other hardware. In some other instances, the receive module 107 may be implemented using a combination of hardware and software. In the present disclosure, operations described as being performed by the receive module 107 may include operations that the receive module 107 may direct a corresponding system to perform. For example, the receive module 107 may be configured to receive data from the first data lane 120 and/or the second data lane 125 which may be transmitted via a serial transmission from the transmit module 112.

In some embodiments, the first component 105 may be configured to receive data within a time window. For example, the first component 105 may include a synchronization with the second component 110 such that transmitted data from the transmit module 112 may include a time window in which the receive module 107 may expect to receive the transmitted data. In instances in which the first component 105 fails to receive transmitted data within the time window, the first component 105 may become disabled, may automatically reset, and/or may no longer receive transmissions from the second component 110. For example, in instances in which the first component 105 is receiving transmitted data from the second component 110 and a next transmitted data is not received within a time window, the first component 105 may become dysfunctional and/or the first component 105 may no longer receive transmitted data from the second component 110. In these and other embodiments, the receive module 107 may be configured to receive transmitted data that may be transmitted to the first component 105.

In some embodiments, transmitted data via the first data lane 120 and via the second data lane 125 may experience similar propagation times between the second component 110 and the first component 105. For example, transmitted data between the second component 110 and the first component 105 via the first data lane 120 may include a first propagation time and transmitted data via the second data lane 125 may include the first propagation time.

Alternatively, or additionally, transmitted data via the first data lane 120 and via the second data lane 125 may include dissimilar propagation times between the second component 110 and the first component 105. For example, transmitted data between the second component 110 and the first component 105 via the first data lane 120 may include a first propagation time and transmitted data via the second data lane 125 may include a second, different propagation time. In these and other embodiments, the propagation times associated with the first data lane 120 and/or the second data lane 125 may be affected by one or more physical characteristics of the first data lane 120 and/or the second data lane 125. For example, a length of the data lane, an orientation and/or path of the data lane, a physical medium of the data lane, etc., may each contribute to the propagation times associated with the data lane (e.g., the first data lane 120 and/or the second data lane 125).

In some embodiments, the external stimuli 115 may alter the propagation times associated with transmitted data via the first data lane 120 and/or via the second data lane 125. For example, in instances in which transmitted data via the first data lane 120 and via the second data lane 125 include similar propagation times and the first data lane 120 is affected by the external stimuli 115, the propagation time associated with the first data lane 120 may be greater than the propagation time associated with the second data lane 125. In some embodiments, the external stimuli 115 may include temperature sources, noise sources, the passage of time and related effects (e.g., component degradation and/or changes), and/or the like. In these and other embodiments, the external stimuli 115 may vary over time. For example, in instances in which the external stimuli 115 includes a temperature source, the temperature associated with the external stimuli 115 may rise and/or fall over time.

In some embodiments, differences in the propagation times that may be caused by the external stimuli 115 between different data lanes in the system 100 may cause a skew of the propagation of transmitted data via the data lanes. For example, in instances in which a propagation time associated with the first data lane 120 increases, such as in association with varying external stimuli 115, the propagation of the transmitted data over the first data lane 120 may become skewed which may affect the reception of the transmitted data by the receive module 107.

In some embodiments, data to be transmitted from the second component 110 to the first component 105 may be divided up such that the data may be transmitted over more than one data lane, such as the first data lane 120 and the second data lane 125. For example, data to be transmitted may be divided into a first data portion and a second data portion, where the first data portion may be transmitted via the first data lane 120 and the second data portion may be transmitted via the second data lane 125.

In some embodiments, the transmit module 112 may be configured to transmit data, including data that may be divided up, in accordance with a transmission configuration. In some embodiments, the transmission configuration may include one or more transmission windows. The transmission windows may each be associated a portion of the transmitted data. For example, data divided into a first portion and a second portion may each be assigned a transmission window, such as the first portion may be transmitted by the transmit module 112 during a first transmission window and the second portion may be transmitted during a second transmission window.

Alternatively, or additionally, the transmission configuration may include an assigned data lane. For example, data divided into a first portion and a second portion may each be assigned a data lane, such as the first portion may be transmitted via the first data lane 120 and the second portion may be transmitted via the second data lane 125.

In some embodiments, the transmission configuration may include both one or more transmission windows and assigned data lanes. For example, data divided into a first portion and a second portion may each be assigned a transmission window and a data lane, such as the first portion may be transmitted by the transmit module 112 during a first transmission window via the first data lane 120 and the second portion may be transmitted during a second transmission window via the second data lane 125.

In some embodiments, the transmit module 112 may be configured to transmit one or more initial symbols via the first data lane 120 and the second data lane 125 to the receive module 107. For example, the transmit module 112 may transmit initial symbols via the first data lane 120 and the second data lane 125 at substantially the same time to the receive module 107. Alternatively, the initial symbols may be transmitted by the transmit module 112 with an offset, such as a predetermined offset, such that the receive module 107 may receive a first initial symbol via the first data lane 120, followed by a second initial symbol via the second data lane 125 offset from the first initial symbol, and so forth. Either option for transmission of initial symbols is contemplated and to simplify the disclosure, additional discussion will relate to substantially simultaneous transmission.

In instances in which no skew is present in the system 100, the initial symbols may be received by the receive module 107 at substantially the same time. In instances in which the initial symbols are not received by the receive module 107 at substantially the same time, the differences may be due to the skew from the physical characteristics of the first data lane 120 and/or the second data lane 125. The receive module 107 may obtain the difference in time of the received initial symbols via the first data lane 120 and the received initial symbols via the second data lane 125 and may compensate for the skew introduced to the propagation of transmissions over the first data lane 120 and/or the second data lane 125. As described further herein, the compensation for the introduced skew may include the receive module 107 adjusting an expected transmission window and/or a sampling time such that subsequent transmissions from the transmit module 112 may be received.

In some embodiments, the initial symbols may be used to identify and compensate for skew that may be introduced with the physical characteristics of the first data lane 120 and the second data lane 125. For example, the receive module 107 may use the initial symbols to determine an expected transmission window associated with a transmission window from the transmit module 112, for each data lane. In some embodiments, the receive module 107 may configure a sampling time associated with the expected transmission window for each data lane. For example, the receive module 107 may determine a first sampling time within a first expected transmission window associated with a first transmission window, where the first transmission window may be determined by the transmit module 112. In these and other embodiments, the initial symbols may be used by the receive module 107 to configure the receive module 107 to receive transmitted data from the transmit module 112.

In some embodiments, the initial symbols may be used in conjunction with determining a transmission spacing between the first data lane 120 and the second data lane 125. For example, as described herein, the initial symbols may be used by the receive module 107 to compensate for skew in the propagation of transmitted data over the first data lane 120 and/or the second data lane 125. Following the compensation by the receive module 107, the receive module 107 may determine a transmission window which may include a window of time for each transmission on each data lane that transmitted data may be received by the receive module 107. In some embodiments, transmitted data from the transmit module 112 may include a transmission spacing which may align with the transmission window such that transmitted data may be received sequentially from the first data lane 120 and the second data lane 125.

In some embodiments, a first portion of transmitted data via the first data lane 120 may be separated from a second portion of transmitted data via the second data lane 125 by the transmission spacing. In some embodiments, the transmission spacing may include a temporal spacing separating a first transmission window associated with the first portion of transmitted data from a second transmission window associated with the second portion of transmitted data. In some embodiments the transmission spacing may include a discrete amount of time, such as a number of milliseconds separating the first transmission window from the second transmission window. In these and other embodiments, the transmission spacing may be applied by the transmit module 112 in conjunction with the transmitting data and/or symbols (e.g., initial symbols, de-skew symbols) to contribute to the receive module 107 receiving the transmitted data and/or the transmitted symbols.

In some embodiments, the initial symbols may be transmitted prior to transmission of data between the second component 110 and the first component 105. For example, the initial symbols may be transmitted prior to run-time operation of the system 100, where run-time operation may include the transmission of data from the second component 110 to the first component 105.

In some embodiments, the initial symbols may differ from symbols that may be associated with transmitted data. For example, in instances in which transmitted data from the transmit module 112 include a first set of symbols, the initial symbols may include a second set of symbols that are mutually exclusive from the first set of symbols. For example, in some embodiments, no symbol from the second set of symbols may be present in the first set of symbols. Symbols in the present disclosure may include a sequence of data bits having a predetermined length.

Following the transmission of the initial symbols and associated skew compensation as described above, the system 100 may perform run-time operations which may include transmitting data from the transmit module 112 to the receive module 107. In some embodiments, additional skew other than that accounted for during initialization may be introduced to the propagation of the transmitted data, such as due to the external stimuli 115. In some embodiments, if left uncompensated, the skew may vary the propagation time of the transmitted data by an amount above a threshold which may cause the receive module 107 to miss sampling the transmitted data, such that the transmitted data may be lost and/or the first component 105 may crash. In some embodiments, the system 100 may compensate for the skew by transmitting de-skew symbols during run-time operations, such as from the transmit module 112 to the receive module 107.

In some embodiments, the transmit module 112 may be configured to transmit de-skew symbols to the receive module 107, such as via the first data lane 120 and/or the second data lane 125. In some embodiments, the de-skew symbols may be used to remove skew that may be introduced to the propagation of the transmitted data in the first data lane 120 and/or the second data lane 125 for example, due to changes in the external stimuli 115. The de-skew symbols may be used by the system 100 to remove skew similarly to the initial symbols, as described herein. For example, the transmit module 112 may transmit the de-skew symbols via the first data lane 120 and the second data lane 125 at substantially the same time, and/or with an offset, to the receive module 107 to obtain actual propagation times. The receive module 107, which may have already compensated for skew from the physical characteristics of the first data lane 120 and/or the second data lane 125, may be configured to compare differences in the actual propagation times of the de-skew symbols with the expected propagation times of transmitted data. The expected propagation times may include an amount of time a transmission takes to propagate from the transmit module 112 to the receive module 107, including the compensation for skew due to the physical characteristics of the first data lane 120 and/or the second data lane 125.

Based on the differences between the expected propagation times and the actual propagation times of the transmitted data via the first data lane 120 and/or the second data lane 125, the receive module 107 may compensate for the skew introduced to the propagation of transmissions over the first data lane 120 and/or the second data lane 125.

In some embodiments, the de-skew symbols may include partially, substantially, or all of the same symbols as the initial symbols. For example, the de-skew symbols and the initial symbols may be obtained from a first set of symbols, such that the de-skew symbols and the initial symbols may include one or more similar symbols. Alternatively, or additionally, the de-skew symbols may differ from the initial symbols. For example, the de-skew symbols may be obtained from a first set of symbols and the initial symbols may be obtained from a second set of symbols, where symbols of the first set of symbols and symbols of the second set of symbols may be mutually exclusive.

In these and other embodiments, the de-skew symbols may differ from symbols that may be associated with transmitted data. For example, in instances in which transmitted data from the transmit module 112 include a first set of symbols, the de-skew symbols may include a second set of symbols that are mutually exclusive from the first set of symbols.

In some embodiments, a number of transmitted de-skew symbols may be less than a number of transmitted initial symbols. For example, the transmitted de-skew symbols may include a number of symbols N, and the transmitted initial symbols may include a multiple of the N symbols, such as 2N, 5N, 10N, 40N, 100N, 250N, 1,000N, 10,000N, 30,000N, and/or other multiples of the N symbols.

In some embodiments, the de-skew symbols may include a first subset of symbols, a second subset of symbols, and/or a third subset of symbols. The first subset of symbols may be associated with the start of the transmission of the de-skew symbols. The second subset of symbols may include the de-skew symbols that may be used by the receive module 107 to remove skew that may be introduced to the propagation of the transmitted data. The third subset of symbols may be associated with the end of the transmission of the de-skew symbols. For example, the transmit module 112 may transmit the first subset of symbols to provide an indication to the receive module 107 that de-skew symbols may be transmitted thereafter. The transmit module 112 may transmit the second subset of symbols which may be used by the receive module 107 to compensate for skew in the propagation of the transmitted data. The transmit module 112 may transmit the third subset of symbols to provide an indication to the receive module 107 that an end of the transmitted de-skew symbols has been reached and/or that transmitted data may resume transmitting from the transmit module 112 to the receive module 107 following the de-skew symbols.

In some embodiments, the transmit module 112 may be configured to repeat the transmission of the de-skew symbols, including the first subset of symbols, the second subset of symbols, and/or the third subset of symbols, one or more times. In instances in which the transmit module 112 repeats the transmission of the de-skew symbols and the receive module 107 has already received the de-skew symbols, the receive module 107 may ignore the repeated transmissions. For example, in instances in which the first subset of symbols is transmitted three times and the receive module 107 receives the first transmission of the first subset of symbols, the receive module 107 may ignore the second transmission and/or the third transmission associated with the first subset of symbols.

In some embodiments, the frequency at which the de-skew symbols are transmitted from the transmit module 112 to the receive module 107 may include an interval. In some embodiments, the interval may include a predetermined interval. For example, the interval may be set to an interval value prior to operation of the components of the system 100. In some embodiments, the interval value may include a number of milliseconds, such as any value between one hundred milliseconds to five seconds. The interval value may be larger than five seconds or smaller than one hundred milliseconds, which are simply provided as non-limiting examples of interval values.

Alternatively, or additionally, the interval may be determined based on a skew estimate that may be introduced to the propagation of the transmitted data via the first data lane 120 and/or the second data lane 125. For example, a skew estimate may be obtained based on anticipated contributions of the external stimuli 115 to the propagation times of transmitted data via the first data lane 120 and/or the second data lane 125. In an example, an estimated temperature variation of a temperature source may be obtained and used to estimate variations to the propagation times of transmitted data via the first data lane 120 and/or the second data lane 125. The estimated variations to the propagation times due to the estimated temperature variation may be used to adjust the interval such that skew associated with the propagation of transmitted data via the first data lane 120 and/or the second data lane 125 may not exceed a threshold, as described herein. For example, as the temperature increases, the impact of this external stimuli 115 may be increased, and thus the interval may be decreased to account for the rise of temperature. In another example, an estimated noise from a noise source may be obtained and used to estimate variations to the propagation times of transmitted data via the first data lane 120 and/or the second data lane 125. Similar to the estimated temperature variation, the estimated noise may be used to adjust the interval. For example, the more estimated noise, the greater the impact of this external stimuli 115, and thus the interval may be decreased. The forgoing are examples of external stimuli that may contribute to variations in propagation times of transmitted data. Each external stimuli may be estimated individually and/or collectively and used to estimate variations to the propagation times of transmitted data.

Alternatively, or additionally, the interval may be based on a user input. For example, a user may determine the interval to be a number of milliseconds based on a heuristic or empirical analysis of the external stimuli and the resulting effects on the skew. Alternatively, or additionally, the interval may be in response to feedback from the receive module 107. For example, the receive module 107 may be configured to determine an amount of skew associated with the propagation of the transmitted data via the first data lane 120 and/or transmitted data via the second data lane 125 using the de-skew symbols, as described above. The receive module 107 may be configured to compare the determined skew to a threshold amount and in instances in which a ratio of the determined skew to the threshold amount is within a margin, the receive module 107 may transmit an indication to the transmit module 112 to adjust the interval. Alternatively, or additionally, the receive module 107 may compare a rate of change of the determined skew over an interval. In instances in which the rate of change of the determined skew is greater than a threshold, the receive module 107 may transmit an indication to the transmit module 112 to adjust the interval. In these and other embodiments, the receive module 107 may be configured to adjust the interval to be larger or smaller based on the determined skew. For example, in instances in which the ratio of the determined skew and/or the rate of change of the determined skew is below a threshold, the receive module 107 may transmit an indication to the transmit module 112 to adjust the interval to be larger, which may cause the system 100 to use less resources in compensating for skew.

In instances in which the first data lane 120 and/or the second data lane 125 support full-duplex or half-duplex communications, the receive module 107 may transmit an interval update to the transmit module 112. Alternatively, or additionally, in instances in which the first data lane 120 and/or the second data lane 125 support simplex communications, the receive module 107 may transmit an interval update to the transmit module 112 via an additional transmission lane. For example, the additional transmission lane may be associated with a joint test action group (JTAG) communicative connection or a serial wire debug (SWD) communicative connection between the transmit module 112 and the receive module 107. In these and other embodiments, the interval update may be associated with adjustments to a counter and/or a counter length, as further described below.

In these and other embodiments, the interval may be periodic, such that the de-skew symbols may be repeated after the interval has elapsed from an immediately prior transmission of de-skew symbols. For example, in instances in which the interval is T milliseconds, a first set of de-skew symbols may be transmitted, followed by a second set of de-skew symbols after T milliseconds have elapsed, followed by a third set of de-skew symbols after 2T milliseconds have elapsed, and so forth. In some embodiments, each set of de-skew symbols may be the same or similar as other sets of de-skew symbols. Alternatively, or additionally, each set of de-skew symbols may vary from another set of de-skew symbols. For example, de-skew symbols may include a subset of a collection of symbols such that first de-skew symbols may differ from second de-skew symbols and/or third de-skew symbols may include a portion of the first de-skew symbols and/or a portion of the second de-skew symbols.

In some embodiments, the de-skew symbols may be transmitted during and/or interspersed between the transmitted data. For example, during run-time of the system 100, a first portion of transmitted data, a second portion of transmitted data, and a third portion of transmitted data may be transmitted from the transmit module 112 to the receive module 107 with de-skew symbols transmitted between the first portion and the second portion, and between the second portion and the third portion.

In these and other embodiments, the transmit module 112 may obtain a counter associated with the interval, where the counter may determine when the de-skew symbols are transmitted relative to the last transmission of the de-skew symbols (or the initial symbols, such as a first transmission of the de-skew symbols following a transmission of the initial symbols). In some embodiments, the transmit module 112 may obtain the counter from a provided input, such as a user input and/or feedback from another system or device. For example, a user may input a counter length associated with the counter into the transmit module 112. Alternatively, or additionally, the transmit module 112 may obtain the counter by making a determination, such as a counter length associated with the counter. For example, the transmit module 112 may receive feedback associated with the interval and the transmit module 112 may determine to adjust the counter length based on the received feedback.

In some embodiments, the counter may be based on a period of elapsed time. For example, after an elapsed period of time, the counter may provide an indication to the transmit module 112 to transmit the de-skew symbols, and the counter may reset. Alternatively, or additionally, the counter may be based on an amount of data transmitted from the transmit module 112. For example, after a number of bits and/or symbols have been transmitted by the transmit module 112, the counter may provide an indication to the transmit module 112 to transmit the de-skew symbols, and the counter may reset. In some embodiments, the period of elapsed time and the amount of data transmitted may be correlated given a known transmission rate. In these and other embodiments, the de-skew symbols may be transmitted once the counter reaches a threshold, such as a threshold period of time, or a threshold amount of transmitted data, as described above. Upon transmitting the de-skew symbols, the counter may be reset, such that the transmission of the de-skew symbols may be periodic.

In instances in which the transmit module 112 is transmitting data to the receive module 107 and the counter has not reached the threshold, the transmit module 112 may continue to transmit data. In instances in which the counter associated with the transmit module 112 reaches the threshold, the transmit module 112 may transmit the de-skew symbols to the receive module 107. After transmitting the de-skew symbols, the transmit module 112 may cause the counter to reset. In some embodiments, the counter may cause the transmission of the de-skew symbols to be periodic in nature. For example, in instances in which a counter length associated with the counter is static, the transmit module 112 may transmit the de-skew symbols at a periodic interval, based on the counter length and the threshold.

In some embodiments, a counter length associated with the counter may be adjusted to include a greater length or a lesser length, as described herein. For example, in instances in which it is determined that the size of the interval is too large or too small, the counter length associated with the counter may be adjusted to be shorter or longer, respectively, which may adjust the size of the interval.

In some embodiments, the size of the interval may be determined to be too large when a ratio of the determined skew to a maximum skew threshold is less than a first threshold, where the maximum skew threshold indicates a skew amount in which the receive module 107 may no longer receive transmitted data. For example, in instances in which the determined skew is greater than a margin from the maximum skew threshold (e.g., the determined skew is greater than fifty percent from the maximum skew threshold), the interval may be determined to be too small, and the counter length may be adjusted to be longer.

In some embodiments, the size of the interval may be determined to be too small when a ratio of the determined skew to the maximum skew threshold is greater than a second threshold. For example, in instances in which the determined skew is within a margin of the maximum skew threshold (e.g., the determined skew is within ten percent of the maximum skew threshold), the interval may be determined to be too large, and the counter length may be adjusted to be shorter.

In some embodiments, the counter and/or the interval may be based on a rate of change of propagation of data from the transmit module 112 to the receive module 107 caused by the external stimuli 115. The rate of change of the propagation of data may be caused by the external stimuli 115, including variations in the external stimuli 115. For example, in instances in which the external stimuli 115 includes a heat source, a constant temperature produced by the external stimuli 115 may cause a rate of change in the propagation of data from the transmit module 112 to the receive module 107. In instances in which the external stimuli 115 includes a varying temperature, the rate of change in the propagation of data may be greater than the rate of change in the propagation of data associated with a constant temperature. In these and other embodiments, the counter and/or the interval may be determined based on a worst-case estimate of the rate of change in the propagation of data from the transmit module 112 to the receive module 107. Alternatively, or additionally, the counter and/or the interval may be configurable such that the counter and/or the interval may be adjusted based on the external stimuli 115 and/or variations of the external stimuli 115. For example, in response to one or more new external stimuli 115 in the system 100, the counter length may be shortened such that the interval may be shortened to accommodate for an increased likelihood of a greater rate of change in the propagation of data compared to before the one or more new external stimuli 115 were present in the system 100. In another example, the counter length may be adjusted based on a length of time the external stimuli 115 are operating, which may cause increased changes in the rate of change in the propagation of data over time. For example, a heat source that turns on may contribute a smaller amount to the rate of change in the propagation of data than a heat source that has been operating for a number of hours.

In some embodiments, the transmit module 112 may be configured to temporarily store data to be transmitted during the transmission of the de-skew symbols, such as in the buffer. For example, the transmit module 112 may pause transmission of data during the transmission of de-skew symbols and the transmit module 112 may store the data to be transmitted in the buffer until the transmission of the de-skew symbols is complete.

In some embodiments, the receive module 107 may be configured to sample for the transmitted data and/or the de-skew symbols at a rate that may be faster than the transmission rate at which the transmitted data and/or the de-skew symbols are transmitted. For example, in instances in which the transmission rate associated with the transmitted data and/or the de-skew symbols is T, the receive module 107 may include a sampling rate of at least 2T and may include any sampling rate greater than 2T.

In some embodiments, the receive module 107 may be configured to adjust a sampling window of the transmitted data in response to receiving the de-skew symbols. For example, following the initial symbols, the receive module 107 may be configured to sample transmitted data and/or de-skew symbols in a middle portion of the sampling window. Due to external stimuli 115, the transmitted data, as received by the receive module 107, may vary from the middle portion of the sampling window. In response to receiving the de-skew symbols, the receive module 107 may be configured to adjust the sampling window such that transmitted data and/or de-skew symbols may be sampled in the middle portion of the sampling window.

In instances in which the skew of the propagation of the transmitted data varies more than a threshold amount, the transmitted data and/or the de-skew symbols may fall outside the sampling window such that the transmitted data and/or the de-skew symbols may not be received by the receive module 107. In some embodiments, the receive module 107 and/or the first component 105 may crash or discontinue operation once the transmitted data and/or the de-skew symbols are failed to be received due to variations in the sampling window relative to the transmitted data and/or the de-skew symbols.

In some embodiments, the processing of the de-skew symbols by the receive module 107 may be performed at a physical layer (PHY) and/or a data link layer (LINK) of the receive module 107. The processing of the transmitted data may first be handled at the PHY and then transmitted to a LINK of the receive module 107. For example, data to be transmitted may be prepared at different layers of the OSI model within the transmit module 112 including adhering to various protocols, interface requirements, and/or standards at each layer. The last layer at which the data may be prepared may be the PHY, after which, the transmit module 112 may transmit the data to the receive module 107. The receive module 107 may receive the transmitted data and perform one or more operations at each layer in reverse order, such as beginning with the PHY (e.g., the last layer to prepare the data before transmitting).

In some embodiments, the PHY and/or the LINK of the receive module 107 may be configured to identify de-skew symbols, such as by one or more control identifiers included in the transmission. In instances in which the receive module 107 identifies PHY control identifiers and/or LINK control identifiers in a transmitted de-skew symbol, the PHY and/or the LINK of the receive module 107 may perform de-skew processing (e.g., such as de-skew processing as described herein) and may not pass the de-skew symbol to subsequent layers of the receive module 107.

The transmitted data may include a similar preparation by the transmit module 112 before transmission to the receive module 107. The transmitted data may not include PHY control identifiers, such that upon reception by the receive module 107, the PHY may perform processing to the transmitted data and then transmit the transmitted data to the LINK and/or other OSI layers of the receive module 107 (e.g., the network layer, the transport layer, the application layer, etc.) for additional processing. In these and other embodiments, the PHY control identifiers and/or the LINK control identifiers may include the de-skew symbols (e.g., as described herein) which may differ from symbols used to represent data. Alternatively, or additionally, the PHY control identifiers and/or the LINK control identifiers may include any other symbols that may indicate to the receive module 107 PHY and/or the LINK that the received data may be processed by the PHY and/or the LINK.

In these and other embodiments, the compensation for skew may be accomplished at the PHY and/or the LINK of the transmit module 112 and/or the PHY and/or the LINK of the receive module 107, as described herein. Handling the de-skew symbol transmission and reception at the respective PHY and/or LINK of the transmit module 112 and the receive module 107 may insulate other OSI layers of the transmit module 112 and the receive module 107 from the de-skew symbols, which reduce and/or eliminate interference with the other OSI layers. For example, the de-skew symbols may be added at the PHY and/or the LINK of the transmit module 112 (e.g., the last two layers of the OSI model) just before transmitting the de-skew symbols, and the de-skew symbols may be received and processed by the PHY and/or the LINK of the receive module 107 (e.g., the first two layers to interact with the received transmission). Further, the compensation for skew may be implemented using hardware which may operate without software and/or firmware support, which may improve the resiliency of the system. Alternatively, or additionally, compensating for skew at the PHY and/or the LINK of the transmit module 112 and the receive module 107 may improve processing time as each transmission may not need to be processed in additional layers following the receive module 107 PHY and/or LINK. Additionally, removing the other layers of the OSI model in the processing of the de-skew symbols may improve the robustness of the communications by reducing impacts to the OSI layers other than PHY and LINK as only the PHY and the LINK of the transmit module 112 and the receive module 107 may process the de-skew symbols. Alternatively, or additionally, the system for compensating for skew described herein may be configured to compensate for skew introduced during a transmission of data, including instances in which a receiver in the system may not be configured to communicate to a transmitter in the system. For example, in instances in which a receiver may not communicate to a transmitter in a system, the system may compensate for skew introduced during the transmission of data using one or more of the methods described herein such that data may continue to be received without a feedback component included in the system. Alternatively, or additionally, the compensation for skew may be performed prior to a receiver in a system entering a bad state in which the receiver may no longer receive transmissions until new initial symbols may be transmitted. In such scenarios, a ratio of the length of the initial symbols relative to de-skew symbols may be such that the period transmission of the de-skew symbols may significantly reduce overhead that may be introduced by the system when additional initialization sequences may be performed.

Modifications, additions, or omissions may be made to the system 100 without departing from the scope of the present disclosure. For example, in some embodiments, the system 100 may include one or more additional data lanes and/or one or more additional external stimuli. Alternatively, or additionally, the system 100 may include any number of other components that may not be explicitly illustrated or described.

Figure 2:
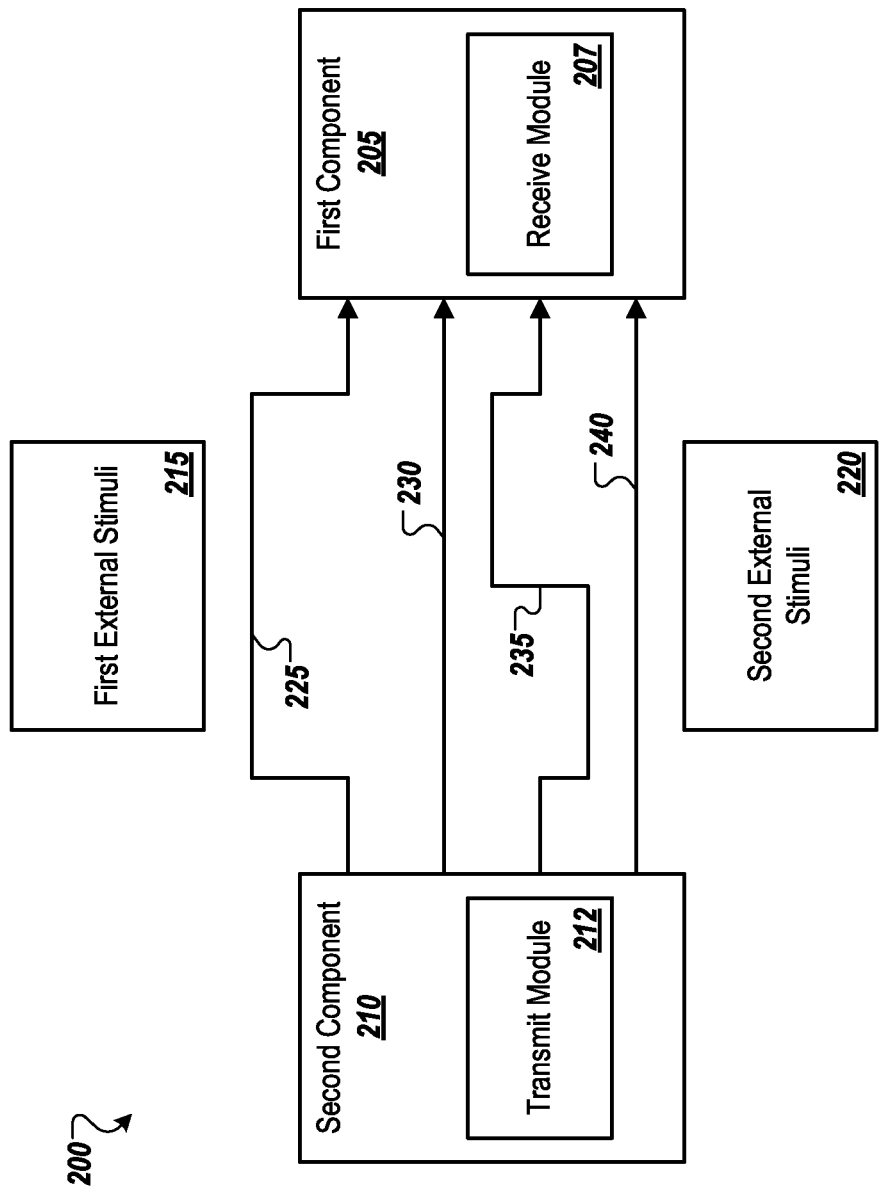
FIG. 2 illustrates another example system configured to perform compensation operations with respect to skew introduced to a propagation of transmitted data, according to one or more embodiments of the present disclosure.

FIG. 2 illustrates another example system 200 configured to perform compensation operations with respect to skew introduced to a propagation of transmitted data, according to one or more embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. The system 100 may include similar features, functionality, and/or components as those of example autonomous machine 500 of FIGS. 5A-5D, example computing device 600 of FIG. 6, and/or example data center 700 of FIG. 7.

The system 200 may include a first component 205, a second component 210, a first external stimuli 215, and a second external stimuli 220. The first component 205 may include a receive module 207. The second component 210 may include a transmit module 212. A first data lane 225, a second data lane 230, a third data lane 235, and a fourth data lane 240 may communicatively couple the first component 205 and the second component 210.

In some embodiments, one or more of the elements of the system 200 may be analogous to one or more of the elements of the system 100 of FIG. 1. For example, the first component 205, the receive module 207, the second component 210, the transmit module 212, and the first external stimuli 215 may be analogous to the first component 105, the receive module 107, the second component 110, the transmit module 112, and the external stimuli 115, respectively, of FIG. 1. Alternatively, or additionally, the first data lane 225, the second data lane 230, the third data lane 235, and/or the fourth data lane 240 may be the same or similar as the first data lane 120 and/or the second data lane 125 of FIG. 1. Further, the second external stimuli 220 may include similarities with the first external stimuli 215, such as the included stimuli (e.g., temperature, noise, the passage of time, etc.) and may represent a physically different location of the source. The second external stimuli 220 may include variations of the stimuli not associated with changes to the first external stimuli 215. For example, the first external stimuli 215 may include a temperature that may increase over time and the second external stimuli 220 may include a generally static temperature. In another example, the first external stimuli 215 may include a noise source and the second external stimuli 220 may include a temperature source that may be unrelated to the noise source of the first external stimuli 215.

In some embodiments, the visualizations of the first data lane 225, the second data lane 230, the third data lane 235, and/or the fourth data lane 240 in FIG. 2 may illustrate different physical characteristics associated with the data lanes, such as a physical path and/or relative location to the first external stimuli 215 and/or the second external stimuli 220. For example, in some embodiments, the first data lane 225 may include a number of turns and may be close in proximity to the first external stimuli 215 and the fourth data lane 240 may be substantially straight and may be close in proximity to the second external stimuli 220.

In some embodiments, the physical characteristics of the first data lane 225, the second data lane 230, the third data lane 235, and/or the fourth data lane 240 may introduce various propagation times associated with transmitted data over each of the first data lane 225, the second data lane 230, the third data lane 235, and/or the fourth data lane 240. For example, transmitted data via the first data lane 225 may include a first propagation time, transmitted data via the second data lane 230 may include a second propagation time, transmitted data via the third data lane 235 may include a third propagation time, and transmitted data via the fourth data lane 240 may include a fourth propagation time, where each of the first propagation time, the second propagation time, the third propagation time, and the fourth propagation time may be different.

In some embodiments, initial symbols may be transmitted from the transmit module 212 to the receive module 207, such as described herein relative to FIG. 1. The initial symbols may be used by the receive module 207 to compensate for the differences in propagation times associated with the first data lane 225, the second data lane 230, the third data lane 235, and/or the fourth data lane 240. For example, the receive module 207 may adjust a sampling window associated with each of the data lanes based on reception of the initial symbols via the first data lane 225, the second data lane 230, the third data lane 235, and/or the fourth data lane 240.

In some embodiments, the first external stimuli 215 and/or the second external stimuli 220 may introduce skew to the propagation of the transmitted data associated with any of the first data lane 225, the second data lane 230, the third data lane 235, and/or the fourth data lane 240. In some embodiments, the proximity of the data lanes to the first external stimuli 215 and/or the second external stimuli 220 may increase or decrease the amount of skew associated with the propagation of transmitted data in each data lane. For example, the first external stimuli 215 may cause a greater skew effect to the propagation of transmitted data in the first data lane 225 than to the propagation of transmitted data in the second data lane 230. In another example, the second external stimuli 220 may cause a greater skew effect to the propagation of transmitted data in the third data lane 235 than to the propagation of transmitted data in the second data lane 230.

Alternatively, or additionally, variations in the first external stimuli 215 and/or the second external stimuli 220 may increase or decrease the amount of skew associated with the propagation of transmitted data in each data lane. For example, in instances in which a temperature associated with the first external stimuli 215 increases, a greater amount of skew may be realized relative to the propagation of the transmitted data via data lanes nearer the first external stimuli 215. For example, in instances in which a temperature associated with the first external stimuli 215 increases, the propagation of the transmitted data via the second data lane 230 may experience a greater amount of skew than the propagation of the transmitted data via the fourth data lane 240.

In these and other embodiments, the system 200 may periodically transmit de-skew symbols from the transmit module 212 to the receive module 207, as described herein. The de-skew symbols may be used to compensate for skew introduced by the first external stimuli 215 and/or the second external stimuli 220 to the propagation of transmitted data via the first data lane 225, the second data lane 230, the third data lane 235, and/or the fourth data lane 240, as described in the present disclosure, such as relative to FIG. 1.

Modifications, additions, or omissions may be made to the system 200 without departing from the scope of the present disclosure. For example, the system 200 may include any number of other components that may not be explicitly illustrated or described.

Figure 3A:
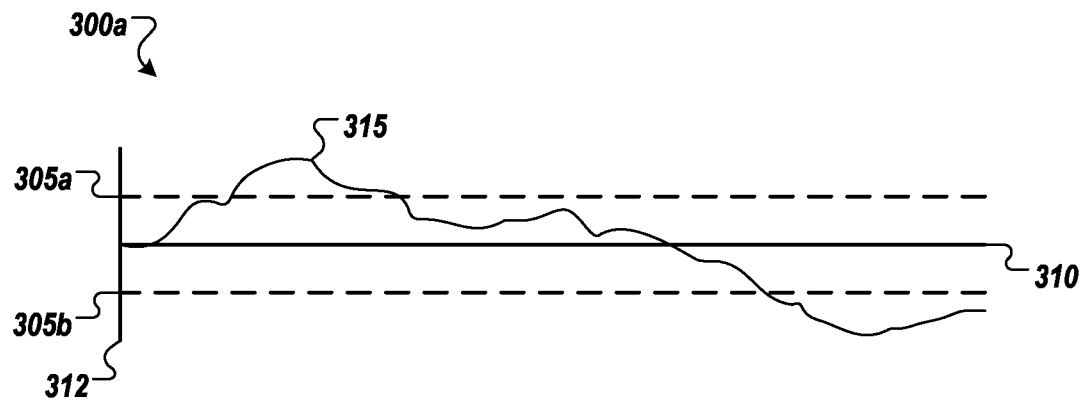
FIG. 3A illustrates an example visual representation of dynamic inter-lane skew associated with a transmission lane over a period of time, according to one or more embodiments of the present disclosure.
Figure 3B:
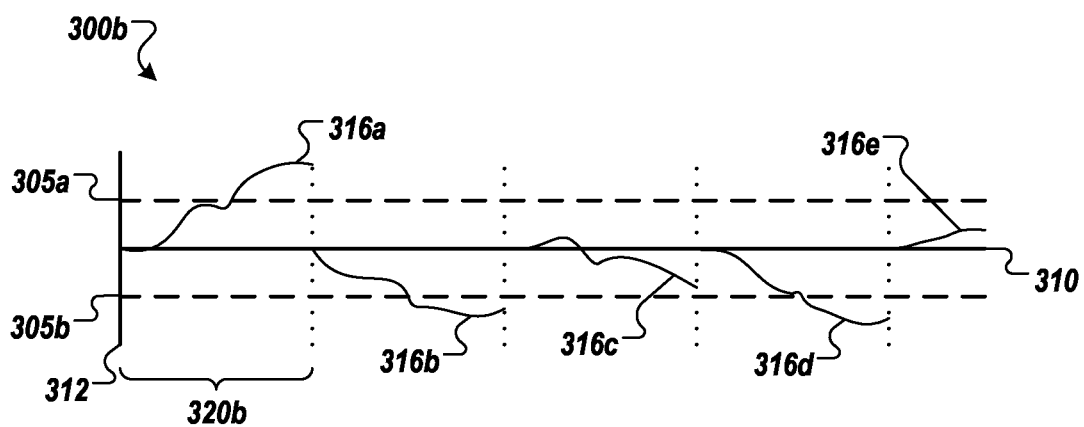
FIG. 3B illustrates an example visual representation of dynamic inter-lane skew including skew compensation having a first interval, according to one or more embodiments of the present disclosure.
Figure 3C:
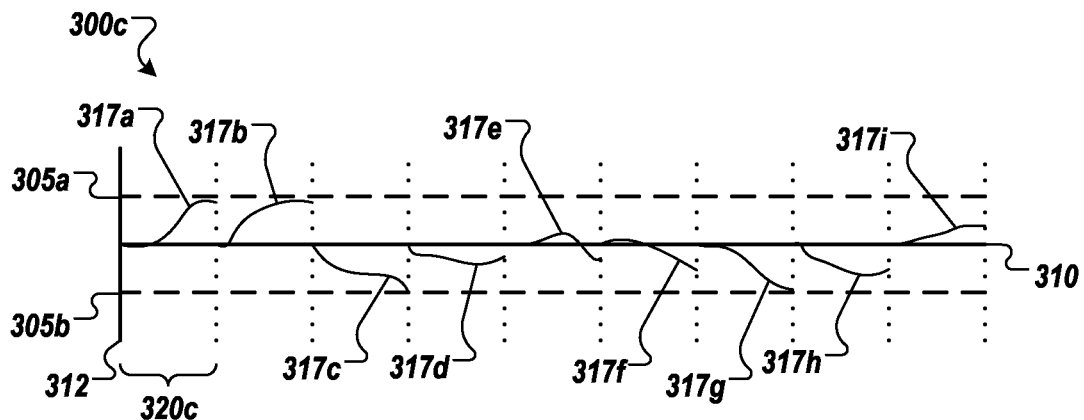
FIG. 3C illustrates an example visual representation of dynamic inter-lane skew including skew compensation having a second interval, according to one or more embodiments of the present disclosure.

FIGS. 3A, 3B, and 3C illustrate example visual representations 300a, 300b, and 300c, respectively, of dynamic inter-lane skew associated with a transmission lane over a period of time, according to one or more embodiments of the present disclosure. In some embodiments, the visual representations 300a, 300b, and 300c may each include an upper threshold 305a, a lower threshold 305b, referred to collectively as thresholds 305, a time axis 310, and a skew axis 312. In some embodiments, the skew may be dynamic as the amount of skew introduced to the propagation of transmitted data may vary in time. The skew may be inter-lane as the amount of skew introduced to the propagation of transmitted data in a first lane may differ from an amount of skew introduced to the propagation of transmitted data in a second lane, such as the first data lane 120 and the second data lane 125 of FIG. 1.

In some embodiments, the time axis 310 may include a linear coordinate system representing a continuous passage of time. In some embodiments, the time axis 310 may include one or more divisions which may occur in periodic intervals, such as illustrated and described relative to FIGS. 3B and 3C. In some embodiments, the skew axis 312 may include a linear coordinate system representing an amount of skew in the propagation of the transmitted data associated with a transmission lane. In these and other embodiments, the time axis 310 and the skew axis 312 may together illustrate variations in an amount of skew relative to time.

In some embodiments, the thresholds 305 may be associated with an amount of skew in which a receiver, such as the receive module 107 of FIG. 1, may transition from an operable state to an inoperable state. For example, in instances in which the amount of skew is between the upper threshold 305a and the lower threshold 305b, the receiver may perform operations including at least receiving transmitted data. In another example, in instances in which the amount of skew becomes greater than the upper threshold 305a or lesser than the lower threshold 306b, the receiver may transition to an inoperable state, where the receiver may not receive transmitted data. The receiver may not receive transmitted data in instances in which the data arrives at the receiver outside a transmission window, as described herein, such as relative to the transmission window FIG. 1.

Referring to FIG. 3A, in some embodiments, dynamic inter-lane skew 315 may illustrate an amount of skew associated with a propagation of transmitted data in a transmission lane relative to time. For example, as one or more external stimuli cause changes to the propagation times of the transmitted data in a transmission lane, the dynamic inter-lane skew 315 may illustrate the skew as the skew changes in time. In some embodiments, the dynamic inter-lane skew 315 in FIG. 3A may be illustrative of a hypothetical example only. For example, in instances in which the dynamic inter-lane skew 315 exceeds either the upper threshold 305a or the lower threshold 305b, the receiver associated with the 300a may become inoperable such that dynamic inter-lane skew 315 obtained after exceeding the thresholds 305 may be ignored by the receiver. Alternatively, or additionally, the dynamic inter-lane skew 315 may provide an indication of the effects the external stimuli have on the skew of the propagation of the transmitted data.

Referring to FIG. 3B, the visual representation 300b may illustrate an implementation of compensation for skew introduced into propagation of transmitted data in a transmission lane, where the compensation may occur following an interval 320b. The skew may include a first segment 316a, a second segment 316b, a third segment 316c, a fourth segment 316d, and a fifth segment 316e, collectively referred to as dynamic inter-lane skew 316.

In some embodiments, the segments of the dynamic inter-lane skew 316 may illustrate a compensation for skew occurring between each segment of the dynamic inter-lane skew 316. For example, the first segment 316a may originate at approximately zero on the skew axis 312 and following variations in the skew associated with the first segment 316a over the interval 320b, a system may perform a compensation for the skew such that the second segment 316b may originate at approximately zero on the skew axis 312, and so forth. In some embodiments, a skew compensation may be performed after each segment and/or at the beginning of each segment of the dynamic inter-lane skew 316. In some embodiments, the compensation for skew may include transmitted de-skew symbols after each interval 320b, as described above, which may be illustrated by each segment of the dynamic inter-lane skew 316 originating at approximately zero on the skew axis 312.

In some embodiments, the skew introduced and visualized in the dynamic inter-lane skew 316 may be caused at least in part by one or more external stimuli, such as the external stimuli 115 of FIG. 1. For example, the external stimuli may cause variations to the skew before and/or after the compensation, such that the dynamic inter-lane skew 316 may vary over the interval 320b in association with the external stimuli. In some embodiments, the compensation for skew may include the transmission and reception of de-skew symbols, such as described herein relative to FIG. 1.

As illustrated in FIG. 3B, the interval 320b may be arranged such that one or more segments of the dynamic inter-lane skew 316 may exceed the threshold 305. For example, the first segment 316a may become greater than the upper threshold 305a, the second segment 316b may become less than the lower threshold 305b, and so forth. In instances such as illustrated in FIG. 3B, a counter associated with the interval 320b may be too large, as described above relative to FIG. 1, as the dynamic inter-lane skew 316 may exceed the thresholds 305.

Referring to FIG. 3C, the visual representation 300c may illustrate an implementation of compensation for skew introduced into propagation of transmitted data in a transmission lane, where the compensation may occur following an interval 320c. In some embodiments, the interval 320c may include a smaller interval than the interval 320b of FIG. 3B. The skew may include a first segment 317a, a second segment 317b, a third segment 317c, a fourth segment 317d, a fifth segment 317e, a sixth segment 317f, a seventh segment 317g, an eighth segment 317h, and a ninth segment 317i, collectively referred to as dynamic inter-lane skew 317.

In some embodiments, the segments of the dynamic inter-lane skew 317 may illustrate a compensation for skew occurring between each segment of the dynamic inter-lane skew 317. For example, the first segment 317a may originate at approximately zero on the skew axis 312 and following variations in the skew associated with the first segment 317a over the interval 320c, a system may perform a compensation for the skew such that the second segment 317b may originate at approximately zero on the skew axis 312, and so forth. In some embodiments, a skew compensation may be performed after each segment and/or at the beginning of each segment of the dynamic inter-lane skew 317. In some embodiments, the compensation for skew may include transmitted de-skew symbols after each interval 320c, as described above, which may be illustrated by each segment of the dynamic inter-lane skew 317 originating at approximately zero on the skew axis 312.

In some embodiments, the skew introduced and visualized in the dynamic inter-lane skew 317 may be caused at least in part by one or more external stimuli, such as the external stimuli 115 of FIG. 1. For example, the external stimuli may cause variations to the skew before and/or after the compensation, such that the dynamic inter-lane skew 317 may vary over the interval 320c in association with the external stimuli. In some embodiments, the compensation for skew may include the transmission and reception of de-skew symbols, such as described above relative to FIG. 1.

As illustrated in FIG. 3C, the interval 320c may be arranged such that each of the segments of the dynamic inter-lane skew 317 may remain between the upper threshold 305a and the lower threshold 305b. For example, each segment of the dynamic inter-lane skew 317 may originate approximately zero on the skew axis 312 and may not vary beyond the thresholds 305 within the interval 320c before a compensation reverts the skew back to approximately zero on the skew axis 312. In instances such as illustrated in FIG. 3C, a counter associated with the interval 320c may be adequately sized, as described relative to FIG. 1, as no segments of the dynamic inter-lane skew 317 may exceed the threshold 305. Alternatively, or additionally, the counter may be determined to be too large as one or more segments of the dynamic inter-lane skew 317 may be within a margin of the thresholds 305. For example, the first segment 317a, the second segment 317b, the third segment 317c, and/or the seventh segment 317g may be within a margin of the thresholds 305, such that the counter may be adjusted to be smaller.

In some embodiments, the interval 320c may be smaller than the interval 320b of FIG. 3B. As such, in some embodiments, the interval 320c may maintain the dynamic inter-lane skew 317 associated with a transmission lane within the thresholds 305 such that an associated receiver may perform operations without entering an inoperable state, such as illustrated in FIGS. 3A and/or 3B.

Although illustrated as two discrete intervals (e.g., interval 320b and interval 320c), other sized intervals may be implemented in a communication system configured to compensate for skew. For example, a communication system with a smaller interval may be more likely to maintain a dynamic inter-lane skew between the thresholds 305 and the communication system with the smaller interval may consume more resources by compensating more often. Alternatively, a communication system with a larger interval may be more likely result in a dynamic inter-lane skew exceeding the thresholds 305 and the communication system with the larger interval may consume less resources by compensating less often than a communication system with a smaller interval.

Modifications, additions, or omissions may be made to the visual representations 300a, 300b, and/or 300c without departing from the scope of the present disclosure. For example, the visual representations 300a, 300b, and/or 300c may include any number of other components that may not be explicitly illustrated or described.

Figure 4:
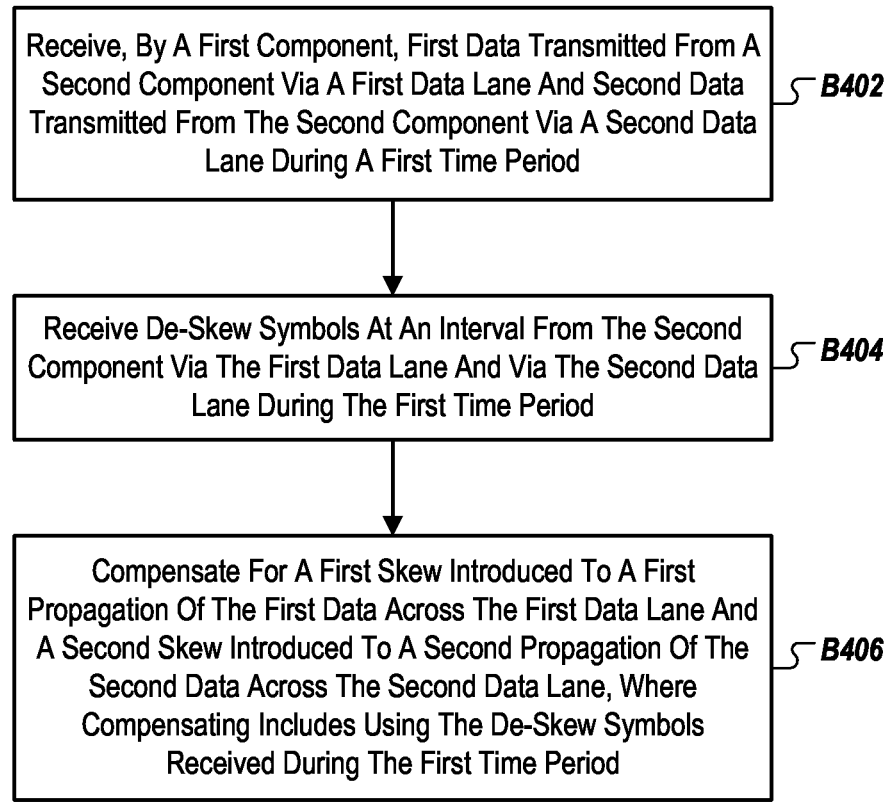
FIG. 4 illustrates an example method for compensating for skew introduced to propagation of transmitted data, according to one or more embodiments of the present disclosure.

FIG. 4 illustrates an example method for compensating for skew introduced to propagation of transmitted data, according to one or more embodiments of the present disclosure. Each block of method 400, described herein, comprises a computing process that may be performed using any combination of hardware, firmware, and/or software. For instance, various functions may be carried out by a processor executing instructions stored in memory. The method 400 may also be embodied as computer-usable instructions stored on computer storage media. The method 400 may be provided by a standalone application, a service or hosted service (standalone or in combination with another hosted service), or a plug-in to another product, to name a few. In addition, the method 400 is described, by way of example, with respect to the system of FIG. 1. However, these methods may additionally or alternatively be executed by any one system, or any combination of systems, including, but not limited to, those described herein. In these or other embodiments, one or more operations of the method 400 may be performed by one or more computing devices, such as that described in further detail below with respect to FIG. 6. In these or other embodiments, one or more operations of the method 400 may be performed by a computing system disposed on a vehicle, such as that described below with respect to FIGS. 5A-5D.

The method 400 may include a block B402 where a first component may receive first data transmitted from a second component via a first data lane. For example, the first component 105/205 may receive second data transmitted from the second component 110/210 via a second data lane. In some embodiments, the first data and the second data may be received by the first component 105/205 during a first time period. In some embodiments, the first time period may include run-time transmissions between the first component 105/205 and the second component 110/210.

At block B404, the first component may receive de-skew symbols at an interval from the second component via the first data lane and via the second data lane. For example, in some embodiments, the de-skew symbols may be received by the first component 105/205 during the first time period.

In some embodiments, the interval may be based on an expected skew introduced to the first propagation in the first data lane or the second propagation in the second data lane. Alternatively, or additionally, the interval may be associated with the skew based on feedback from the first component 105/205. Alternatively, or additionally, the interval may be predetermined by a user. In some embodiments, the expected skew may be based at least one of temperature, noise, passage of time, and/or other external stimuli 115/215/220. In these and other embodiments, the interval may be periodic.

At block B406, the first component may compensate for a first skew introduced to a first propagation of the first data across the first data lane. Alternatively, or additionally, the first component may compensate for a second skew introduced to a second propagation of the second data across the second data lane. For example, the first component 105/205 may compensate for the first skew of the first data and the second skew of the second data using the de-skew symbols received during the first time period. In some embodiments, compensating for the skew may include adjusting a sampling period of the first component 105/205 relative to the first data received via the first data lane.

Modifications, additions, or omissions may be made to the method 400 without departing from the scope of the present disclosure. For example, in some embodiments, the first component 105/205 may receive initial symbols from the second component 110/210 via the first data lane and via the second data lane during a second time period. In some embodiments, the first component 105/205 may be configured to perform an initial alignment of the first data lane relative to the second data lane using the initial symbols.

Although illustrated as discrete blocks, various blocks of the method 400 may be divided into additional blocks, combined into fewer blocks, or eliminated, depending on the desired implementation.

Example Autonomous Vehicle

Figure 5A:
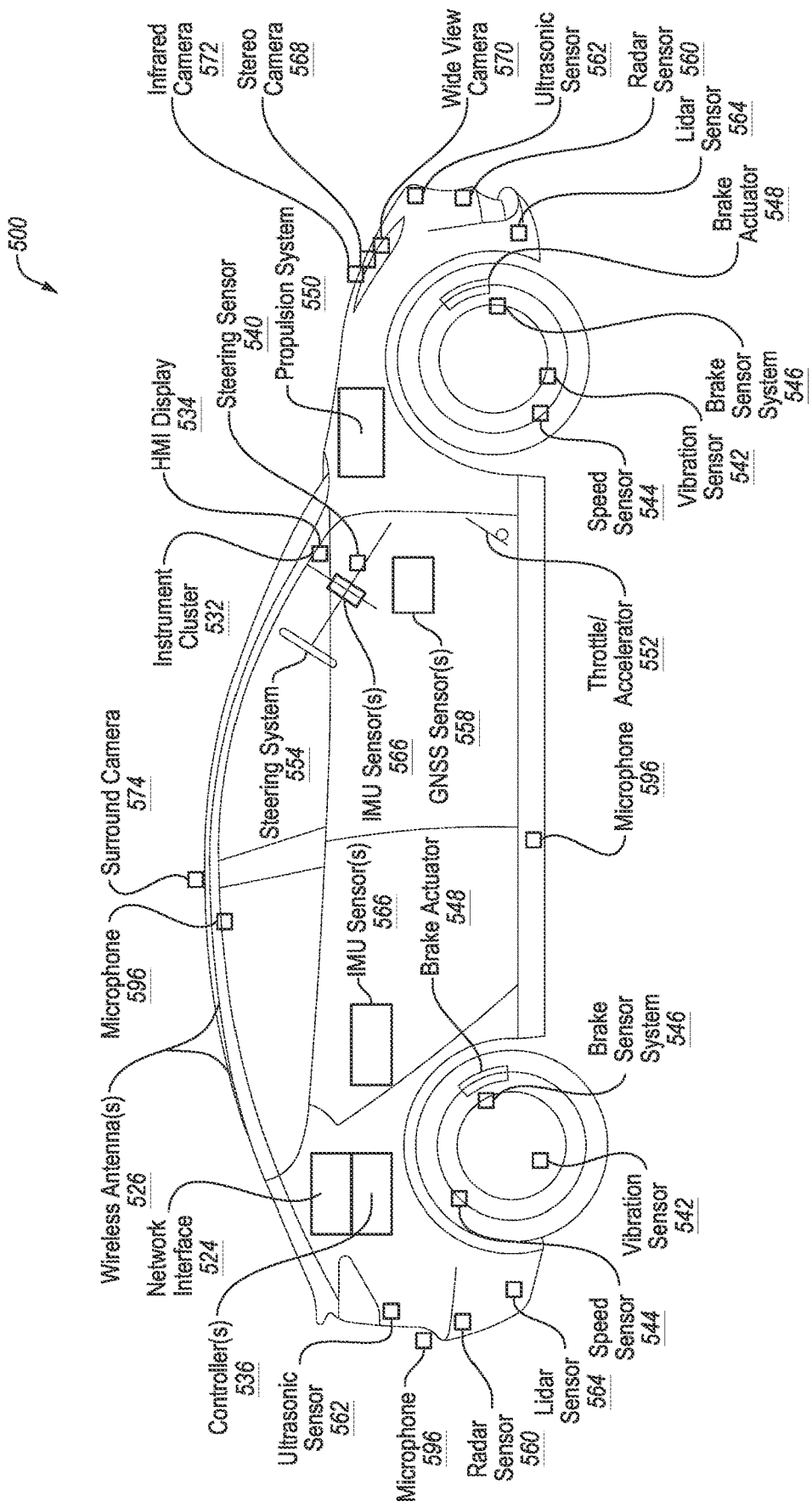
FIG. 5A is an illustration of an example autonomous vehicle, in accordance with some embodiments of the present disclosure.

FIG. 5A is an illustration of an example autonomous vehicle 500, in accordance with some embodiments of the present disclosure. The autonomous vehicle 500 (alternatively referred to herein as the "vehicle 500") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 500 may be capable of functionality in accordance with one or more of Level 3-Level 5 of the autonomous driving levels. For example, the vehicle 500 may be capable of conditional automation (Level 3), high automation (Level 4), and/or full automation (Level 5), depending on the embodiment.

The vehicle 500 may include components such as a chassis, a vehicle body, wheels (e.g., 2, 4, 6, 8, 18, etc.), tires, axles, and other components of a vehicle. The vehicle 500 may include a propulsion system 550, such as an internal combustion engine, hybrid electric power plant, an all-electric engine, and/or another propulsion system type. The propulsion system 550 may be connected to a drive train of the vehicle 500, which may include a transmission, to enable the propulsion of the vehicle 500. The propulsion system 550 may be controlled in response to receiving signals from the throttle/accelerator 552.

A steering system 554, which may include a steering wheel, may be used to steer the vehicle 500 (e.g., along a desired path or route) when the propulsion system 550 is operating (e.g., when the vehicle is in motion). The steering system 554 may receive signals from a steering actuator 556. The steering wheel may be optional for full automation (Level 5) functionality.

The brake sensor system 546 may be used to operate the vehicle brakes in response to receiving signals from the brake actuators 548 and/or brake sensors.

Controller(s) 536, which may include one or more CPU(s), system on chips (SoCs) 504 (FIG. 5C) and/or GPU(s), may provide signals (e.g., representative of commands) to one or more components and/or systems of the vehicle 500. For example, the controller(s) may send signals to operate the vehicle brakes via one or more brake actuators 548, to operate the steering system 554 via one or more steering actuators 556, and/or to operate the propulsion system 550 via one or more throttle/accelerators 552. The controller(s) 536 may include one or more onboard (e.g., integrated) computing devices (e.g., supercomputers) that process sensor signals, and output operation commands (e.g., signals representing commands) to enable autonomous driving and/or to assist a human driver in driving the vehicle 500. The controller(s) 536 may include a first controller 536 for autonomous driving functions, a second controller 536 for functional safety functions, a third controller 536 for artificial intelligence functionality (e.g., computer vision), a fourth controller 536 for infotainment functionality, a fifth controller 536 for redundancy in emergency conditions, and/or other controllers. In some examples, a single controller 536 may handle two or more of the above functionalities, two or more controllers 536 may handle a single functionality, and/or any combination thereof.

The controller(s) 536 may provide the signals for controlling one or more components and/or systems of the vehicle 500 in response to sensor data received from one or more sensors (e.g., sensor inputs). The sensor data may be received from, for example and without limitation, global navigation satellite systems sensor(s) 558 (e.g., Global Positioning System sensor(s)), RADAR sensor(s) 560, ultrasonic sensor(s) 562, LIDAR sensor(s) 564, inertial measurement unit (IMU) sensor(s) 566 (e.g., accelerometer(s), gyroscope(s), magnetic compass(es), magnetometer(s), etc.), microphone(s) 596, stereo camera(s) 568, wide-view camera(s) 570 (e.g., fisheye cameras), infrared camera(s) 572, surround camera(s) 574 (e.g., 360 degree cameras), long-range and/or mid-range camera(s) 598, speed sensor(s) 544 (e.g., for measuring the speed of the vehicle 500), vibration sensor(s) 542, steering sensor(s) 540, brake sensor(s) 546 (e.g., as part of the brake sensor system 546), and/or other sensor types.

One or more of the controller(s) 536 may receive inputs (e.g., represented by input data) from an instrument cluster 532 of the vehicle 500 and provide outputs (e.g., represented by output data, display data, etc.) via a human-machine interface (HMI) display 534, an audible annunciator, a loudspeaker, and/or via other components of the vehicle 500. The outputs may include information such as vehicle velocity, speed, time, map data (e.g., the HD map 522 of FIG. 5C), location data (e.g., the 5location of the vehicle 500, such as on a map), direction, location of other vehicles (e.g., an occupancy grid), information about objects and status of objects as perceived by the controller(s) 536, etc. For example, the HMI display 534 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 500 further includes a network interface 524, which may use one or more wireless antenna(s) 526 and/or modem(s) to communicate over one or more networks. For example, the network interface 524 may be capable of communication over LTE, WCDMA, UMTS, GSM, CDMA2000, etc. The wireless antenna(s) 526 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 5B:
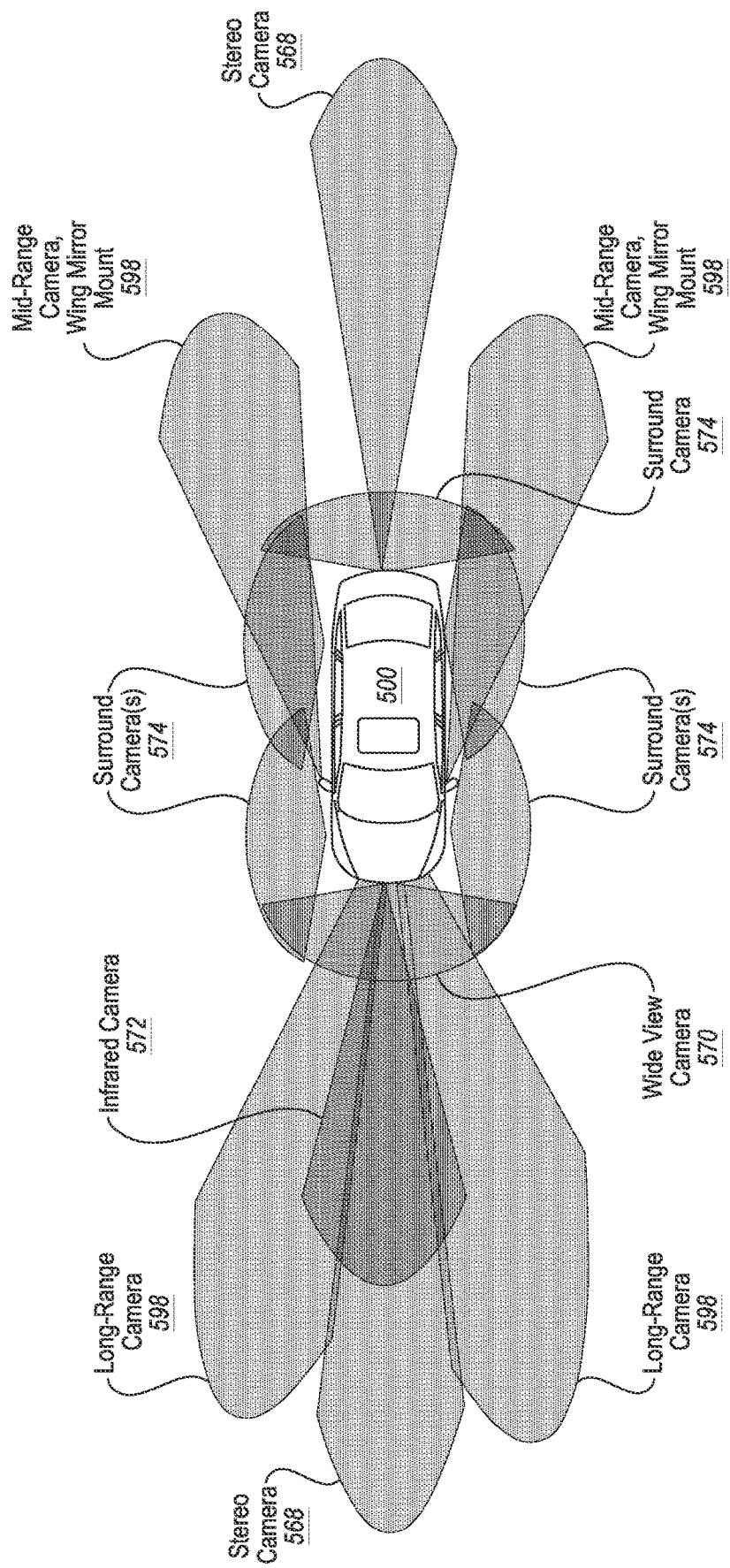
FIG. 5B is an example of camera locations and fields of view for the example autonomous vehicle of FIG. 5A, in accordance with some embodiments of the present disclosure.

FIG. 5B is an example of camera locations and fields of view for the example autonomous vehicle 500 of FIG. 5A, in accordance with some embodiments of the present disclosure. The cameras and respective fields of view are one example embodiment and are not intended to be limiting. For example, additional and/or alternative cameras may be included and/or the cameras may be located at different locations on the vehicle 500.

The camera types for the cameras may include, but are not limited to, digital cameras that may be adapted for use with the components and/or systems of the vehicle 500. The camera(s) may operate at automotive safety integrity level (ASIL) B and/or at another ASIL. The camera types may be capable of any image capture rate, such as 60 frames per second (fps), 520 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom-designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that includes portions of the environment in front of the vehicle 500 (e.g., front-facing cameras) may be used for surround view, to help identify forward-facing paths and obstacles, as well aid in, with the help of one or more controllers 536 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 570 that may be used to perceive objects coming into view from the periphery (e.g., pedestrians, crossing traffic or bicycles). Although only one wide-view camera is illustrated in FIG. 5B, there may any number of wide-view cameras 570 on the vehicle 500. In addition, long-range camera(s) 598 (e.g., a long-view stereo camera pair) may be used for depth-based object detection, especially for objects for which a neural network has not yet been trained. The long-range camera(s) 598 may also be used for object detection and classification, as well as basic object tracking.

One or more stereo cameras 568 may also be included in a front-facing configuration. The stereo camera(s) 568 may include an integrated control unit comprising a scalable processing unit, which may provide a programmable logic (e.g., FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 568 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 568 may be used in addition to, or alternatively from, those described herein.

Cameras with a field of view that includes portions of the environment to the side of the vehicle 500 (e.g., side-view cameras) may be used for surround view, providing information used to create and update the occupancy grid, as well as to generate side impact collision warnings. For example, surround camera(s) 574 (e.g., four surround cameras 574 as illustrated in FIG. 5B) may be positioned around the vehicle 500. The surround camera(s) 574 may include wide-view camera(s) 570, fisheye camera(s), 360-degree camera(s), and/or the like. For example, four fisheye cameras may be positioned on the vehicle's front, rear, and sides. In an alternative arrangement, the vehicle may use three surround camera(s) 574 (e.g., left, right, and rear), and may leverage one or more other camera(s) (e.g., a forward-facing camera) as a fourth surround-view camera.

Cameras with a field of view that include portions of the environment to the rear of the vehicle 500 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 598, stereo camera(s) 568), infrared camera(s) 572, etc.), as described herein.

Figure 5C:
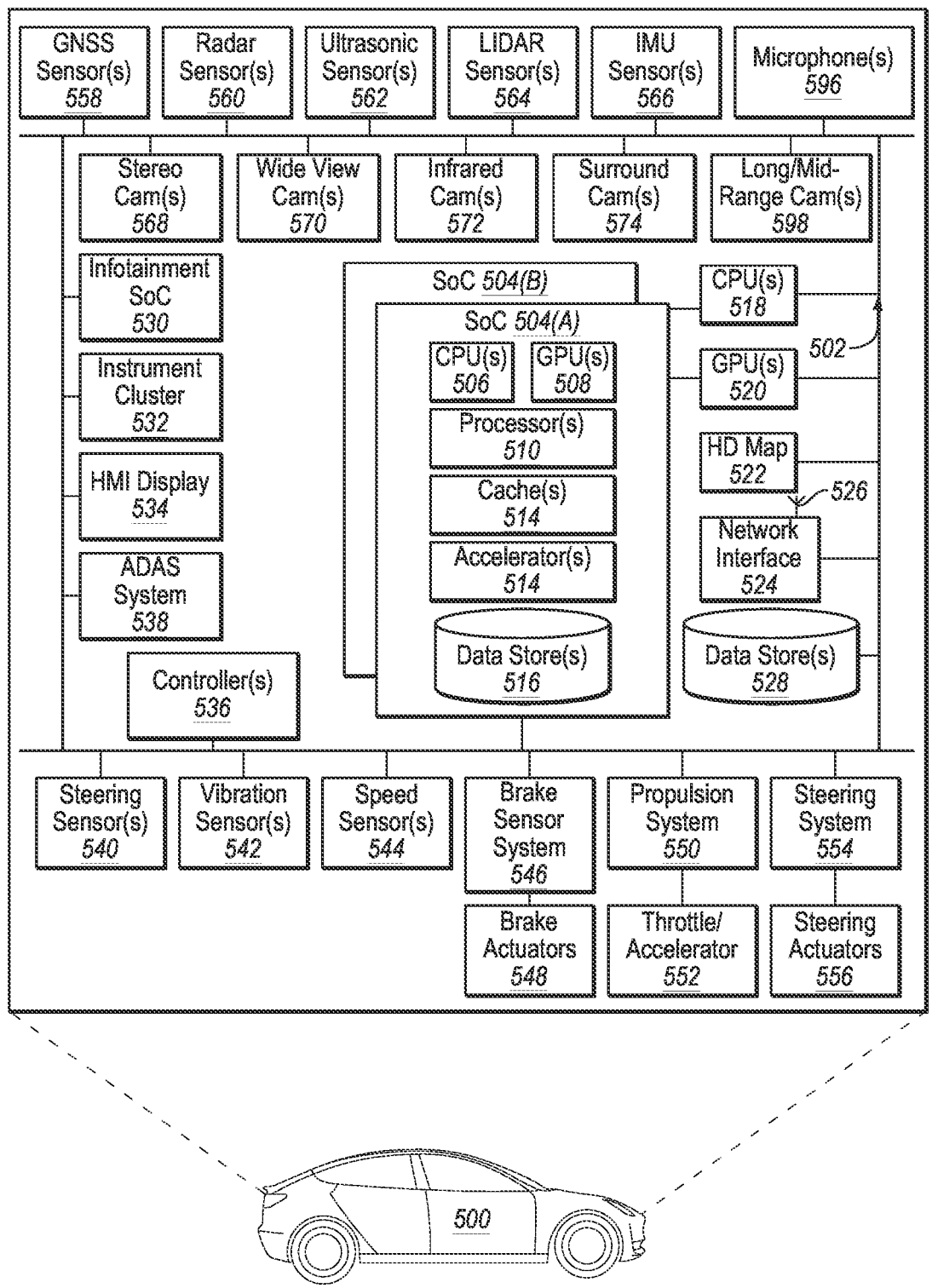
FIG. 5C is a block diagram of an example system architecture for the example autonomous vehicle of FIG. 5A, in accordance with some embodiments of the present disclosure.

FIG. 5C is a block diagram of an example system architecture for the example autonomous vehicle 500 of FIG. 5A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 500 in FIG. 5C is illustrated as being connected via bus 502. The bus 502 may include a Controller Area Network (CAN) data interface (alternatively referred to herein as a "CAN bus"). A CAN may be a network inside the vehicle 500 used to aid in control of various features and functionality of the vehicle 500, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 502 is described herein as being a CAN bus, this is not intended to be limiting. For example, in addition to, or alternatively from, the CAN bus, FlexRay and/or Ethernet may be used. Additionally, although a single line is used to represent the bus 502, this is not intended to be limiting. For example, there may be any number of busses 502, which may include one or more CAN busses, one or more FlexRay busses, one or more Ethernet busses, and/or one or more other types of busses using a different protocol. In some examples, two or more busses 502 may be used to perform different functions, and/or may be used for redundancy. For example, a first bus 502 may be used for collision avoidance functionality and a second bus 502 may be used for actuation control. In any example, each bus 502 may communicate with any of the components of the vehicle 500, and two or more busses 502 may communicate with the same components. In some examples, each SoC 504, each controller 536, and/or each computer within the vehicle may have access to the same input data (e.g., inputs from sensors of the vehicle 500), and may be connected to a common bus, such the CAN bus.

The vehicle 500 may include one or more controller(s) 536, such as those described herein with respect to FIG. 5A. The controller(s) 536 may be used for a variety of functions. The controller(s) 536 may be coupled to any of the various other components and systems of the vehicle 500 and may be used for control of the vehicle 500, artificial intelligence of the vehicle 500, infotainment for the vehicle 500, and/or the like.

The vehicle 500 may include a system(s) on a chip (SoC) 504. The SoC 504 may include CPU(s) 506, GPU(s) 508, processor(s) 510, cache(s) 512, accelerator(s) 514, data store(s) 516, and/or other components and features not illustrated. The SoC(s) 504 may be used to control the vehicle 500 in a variety of platforms and systems. For example, the SoC(s) 504 may be combined in a system (e.g., the system of the vehicle 500) with an HD map 522 which may obtain map refreshes and/or updates via a network interface 524 from one or more servers (e.g., server(s) 578 of FIG. 5D).

The CPU(s) 506 may include a CPU cluster or CPU complex (alternatively referred to herein as a "CCPLEX"). The CPU(s) 506 may include multiple cores and/or L2 caches. For example, in some embodiments, the CPU(s) 506 may include eight cores in a coherent multi-processor configuration. In some embodiments, the CPU(s) 506 may include four dual-core clusters where each cluster has a dedicated L2 cache (e.g., a 2 MB L2 cache). The CPU(s) 506 (e.g., the CCPLEX) may be configured to support simultaneous cluster operation enabling any combination of the clusters of the CPU(s) 506 to be active at any given time.

The CPU(s) 506 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 506 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 508 may include an integrated GPU (alternatively referred to herein as an "iGPU"). The GPU(s) 508 may be programmable and may be efficient for parallel workloads. The GPU(s) 508, in some examples, may use an enhanced tensor instruction set. The GPU(s) 508 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 508 may include at least eight streaming microprocessors. The GPU(s) 508 may use computer-based application programming interface(s) (API(s)). In addition, the GPU(s) 508 may use one or more parallel computing platforms and/or programming models (e.g., NVIDIA's CUDA).

The GPU(s) 508 may be power-optimized for best performance in automotive and embedded use cases. For example, the GPU(s) 508 may be fabricated on a Fin field-effect transistor (FinFET). However, this is not intended to be limiting, and the GPU(s) 508 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread-scheduling capability to enable finer-grain synchronization and cooperation between parallel threads. The streaming microprocessors may include a combined L1 data cache and shared memory unit in order to improve performance while simplifying programming.

The GPU(s) 508 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 508 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 508 to access the CPU(s) 506 page tables directly. In such examples, when the GPU(s) 508 memory management unit (MMU) experiences a miss, an address translation request may be transmitted to the CPU(s) 506. In response, the CPU(s) 506 may look in its page tables for the virtual-to-physical mapping for the address and transmits the translation back to the GPU(s) 508. As such, unified memory technology may allow a single unified virtual address space for memory of both the CPU(s) 506 and the GPU(s) 508, thereby simplifying the GPU(s) 508 programming and porting of applications to the GPU(s) 508.

In addition, the GPU(s) 508 may include an access counter that may keep track of the frequency of access of the GPU(s) 508 to memory of other processors. The access counter may help ensure that memory pages are moved to the physical memory of the processor that is accessing the pages most frequently.

The SoC(s) 504 may include any number of cache(s) 512, including those described herein. For example, the cache(s) 512 may include an L3 cache that is available to both the CPU(s) 506 and the GPU(s) 508 (e.g., that is connected to both the CPU(s) 506 and the GPU(s) 508). The cache(s) 512 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 504 may include an arithmetic logic unit(s) (ALU(s)) which may be leveraged in performing processing with respect to any of the variety of tasks or operations of the vehicle 500—such as processing DNNs. In addition, the SoC(s) 504 may include a floating point unit(s) (FPU(s)) —or other math coprocessor or numeric coprocessor types—for performing mathematical operations within the system. For example, the SoC(s) 104 may include one or more FPUs integrated as execution units within a CPU(s) 506 and/or GPU(s) 508.

The SoC(s) 504 may include one or more accelerators 514 (e.g., hardware accelerators, software accelerators, or a combination thereof). For example, the SoC(s) 504 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 508 and to off-load some of the tasks of the GPU(s) 508 (e.g., to free up more cycles of the GPU(s) 508 for performing other tasks). As an example, the accelerator(s) 514 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 514 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 508, and by using an inference accelerator, for example, a designer may target either the DLA(s) or the GPU(s) 508 for any function. For example, the designer may focus processing of CNNs and floating point operations on the DLA(s) and leave other functions to the GPU(s) 508 and/or other accelerator(s) 514.

The accelerator(s) 514 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 506. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 514 (e.g., the hardware acceleration cluster) may include a computer vision network on-chip and SRAM, for providing a high-bandwidth, low latency SRAM for the accelerator(s) 514. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 504 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 514 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. For example, the PVA may be used to process raw RADAR data (e.g., using a 4D Fast Fourier Transform) to provide a processed RADAR signal before emitting the next RADAR pulse. In other examples, the PVA is used for time of flight depth processing, by processing raw time of flight data to provide processed time of flight data, for example.

The DLA may be used to run any type of network to enhance control and driving safety, including, for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 566 output that correlates with the vehicle 500 orientation, distance, 3D location estimates of the object obtained from the neural network and/or other sensors (e.g., LIDAR sensor(s) 564 or RADAR sensor(s) 560), among others.

The SoC(s) 504 may include data store(s) 516 (e.g., memory). The data store(s) 516 may be on-chip memory of the SoC(s) 504, which may store neural networks to be executed on the GPU and/or the DLA. In some examples, the data store(s) 516 may be large enough in capacity to store multiple instances of neural networks for redundancy and safety. The data store(s) 5116 may comprise L2 or L3 cache(s) 512. Reference to the data store(s) 516 may include reference to the memory associated with the PVA, DLA, and/or other accelerator(s) 514, as described herein.

The SoC(s) 504 may include one or more processor(s) 510 (e.g., embedded processors). The processor(s) 510 may include a boot and power management processor that may be a dedicated processor and subsystem to handle boot power and management functions and related security enforcement. The boot and power management processor may be a part of the SoC(s) 504 boot sequence and may provide runtime power management services. The boot power and management processor may provide clock and voltage programming, assistance in system low power state transitions, management of SoC(s) 504 thermals and temperature sensors, and/or management of the SoC(s) 504 power states. Each temperature sensor may be implemented as a ring-oscillator whose output frequency is proportional to temperature, and the SoC(s) 504 may use the ring-oscillators to detect temperatures of the CPU(s) 506, GPU(s) 508, and/or accelerator(s) 514. If temperatures are determined to exceed a threshold, the boot and power management processor may enter a temperature fault routine and put the SoC(s) 504 into a lower power state and/or put the vehicle 500 into a chauffeur to safe-stop mode (e.g., bring the vehicle 500 to a safe stop).

The processor(s) 510 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 510 may further include an always-on processor engine that may provide necessary hardware features to support low power sensor management and wake use cases. The always-on processor engine may include a processor core, a tightly coupled RAM, supporting peripherals (e.g., timers and interrupt controllers), various I/O controller peripherals, and routing logic.

The processor(s) 510 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 510 may further include a real-time camera engine that may include a dedicated processor subsystem for handling real-time camera management.

The processor(s) 510 may further include a high dynamic range signal processor that may include an image signal processor that is a hardware engine that is part of the camera processing pipeline.

The processor(s) 510 may include a video image compositor that may be a processing block (e.g., implemented on a microprocessor) that implements video post-processing functions needed by a video playback application to produce the final image for the player window. The video image compositor may perform lens distortion correction on wide-view camera(s) 570, surround camera(s) 574, and/or on in-cabin monitoring camera sensors. An in-cabin monitoring camera sensor is preferably monitored by a neural network running on another instance of the advanced SoC, configured to identify in-cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 508 is not required to continuously render new surfaces. Even when the GPU(s) 508 is powered on and actively performing 3D rendering, the video image compositor may be used to offload the GPU(s) 508 to improve performance and responsiveness.

The SoC(s) 504 may further include a mobile industry processor interface (MIPI) camera serial interface for receiving video and input from cameras, a high-speed interface, and/or a video input block that may be used for camera and related pixel input functions. The SoC(s) 504 may further include an input/output controller(s) that may be controlled by software and may be used for receiving I/O signals that are uncommitted to a specific role.

The SoC(s) 504 may further include a broad range of peripheral interfaces to enable communication with peripherals, audio codecs, power management, and/or other devices. The SoC(s) 504 may be used to process data from cameras (e.g., connected over Gigabit Multimedia Serial Link and Ethernet), sensors (e.g., LIDAR sensor(s) 564, RADAR sensor(s) 560, etc. that may be connected over Ethernet), data from bus 502 (e.g., speed of vehicle 500, steering wheel position, etc.), data from GNSS sensor(s) 558 (e.g., connected over Ethernet or CAN bus). The SoC(s) 504 may further include dedicated high-performance mass storage controllers that may include their own DMA engines, and that may be used to free the CPU(s) 506 from routine data management tasks.

The SoC(s) 504 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 504 may be faster, more reliable, and even more energy-efficient and space-efficient than conventional systems. For example, the accelerator(s) 514, when combined with the CPU(s) 506, the GPU(s) 508, and the data store(s) 516, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 520) may include a text and word recognition, allowing the supercomputer to read and understand traffic signs, including signs for which the neural network has not been specifically trained. The DLA may further include a neural network that is able to identify, interpret, and provide semantic understanding of the sign, and to pass that semantic understanding to the path-planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path-planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 508.

In some examples, a CNN for facial recognition and vehicle owner identification may use data from camera sensors to identify the presence of an authorized driver and/or owner of the vehicle 500. The always-on sensor processing engine may be used to unlock the vehicle when the owner approaches the driver door and turn on the lights, and, in security mode, to disable the vehicle when the owner leaves the vehicle. In this way, the SoC(s) 504 provide for security against theft and/or carjacking.

In another example, a CNN for emergency vehicle detection and identification may use data from microphones 596 to detect and identify emergency vehicle sirens. In contrast to conventional systems, which use general classifiers to detect sirens and manually extract features, the SoC(s) 504 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 558. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 562, until the emergency vehicle(s) passes.

The vehicle may include a CPU(s) 518 (e.g., discrete CPU(s), or dCPU(s)), that may be coupled to the SoC(s) 504 via a high-speed interconnect (e.g., PCIe). The CPU(s) 518 may include an X86 processor, for example. The CPU(s) 518 may be used to perform any of a variety of functions, including arbitrating potentially inconsistent results between ADAS sensors and the SoC(s) 504, and/or monitoring the status and health of the controller(s) 536 and/or infotainment SoC 530, for example.

The vehicle 500 may include a GPU(s) 520 (e.g., discrete GPU(s), or dGPU(s)), that may be coupled to the SoC(s) 504 via a high-speed interconnect (e.g., NVIDIA's NVLINK). The GPU(s) 520 may provide additional artificial intelligence functionality, such as by executing redundant and/or different neural networks, and may be used to train and/or update neural networks based on input (e.g., sensor data) from sensors of the vehicle 500.

The vehicle 500 may further include the network interface 524 which may include one or more wireless antennas 526 (e.g., one or more wireless antennas for different communication protocols, such as a cellular antenna, a Bluetooth antenna, etc.). The network interface 524 may be used to enable wireless connectivity over the Internet with the cloud (e.g., with the server(s) 578 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 500 information about vehicles in proximity to the vehicle 500 (e.g., vehicles in front of, on the side of, and/or behind the vehicle 500). This functionality may be part of a cooperative adaptive cruise control functionality of the vehicle 500.

The network interface 524 may include an SoC that provides modulation and demodulation functionality and enables the controller(s) 536 to communicate over wireless networks. The network interface 524 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 500 may further include data store(s) 528, which may include off-chip (e.g., off the SoC(s) 504) storage. The data store(s) 528 may include one or more storage elements including RAM, SRAM, DRAM, VRAM, Flash, hard disks, and/or other components and/or devices that may store at least one bit of data.

The vehicle 500 may further include GNSS sensor(s) 5585 (e.g., GPS and/or assisted GPS sensors), to assist in mapping, perception, occupancy grid generation, and/or path planning functions. Any number of GNSS sensor(s) 558 may be used, including, for example and without limitation, a GPS using a USB connector with an Ethernet to serial (RS-232) bridge.

The vehicle 500 may further include RADAR sensor(s) 560. The RADAR sensor(s) 560 may be used by the vehicle 500 for long-range vehicle detection, even in darkness and/or severe weather conditions. RADAR functional safety levels may be ASIL B. The RADAR sensor(s) 560 may use the CAN and/or the bus 502 (e.g., to transmit data generated by the RADAR sensor(s) 560) for control and to access object tracking data, with access to Ethernet to access raw data, in some examples. A wide variety of RADAR sensor types may be used. For example, and without limitation, the RADAR sensor(s) 560 may be suitable for front, rear, and side RADAR use. In some example, Pulse Doppler RADAR sensor(s) are used.

The RADAR sensor(s) 560 may include different configurations, such as long-range with narrow field of view, short-range with wide field of view, short-range side coverage, etc. In some examples, long-range RADAR may be used for adaptive cruise control functionality. The long-range RADAR systems may provide a broad field of view realized by two or more independent scans, such as within a 250 m range. The RADAR sensor(s) 560 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the surrounding of the vehicle 500 at higher speeds with minimal interference from traffic in adjacent lanes. The other two antennae may expand the field of view, making it possible to quickly detect vehicles entering or leaving the vehicle's 500 lane.

Mid-range RADAR systems may include, as an example, a range of up to 560 m (front) or 80 m (rear), and a field of view of up to 42 degrees (front) or 550 degrees (rear). Short-range RADAR systems may include, without limitation, RADAR sensors designed to be installed at both ends of the rear bumper. When installed at both ends of the rear bumper, such a RADAR sensor system may create two beams that constantly monitor the blind spot in the rear and next to the vehicle.

Short-range RADAR systems may be used in an ADAS system for blind spot detection and/or lane change assist.

The vehicle 500 may further include ultrasonic sensor(s) 562. The ultrasonic sensor(s) 562, which may be positioned at the front, back, and/or the sides of the vehicle 500, may be used for park assist and/or to create and update an occupancy grid. A wide variety of ultrasonic sensor(s) 562 may be used, and different ultrasonic sensor(s) 562 may be used for different ranges of detection (e.g., 2.5 m, 4 m). The ultrasonic sensor(s) 562 may operate at functional safety levels of ASIL B.

The vehicle 500 may include LIDAR sensor(s) 564. The LIDAR sensor(s) 564 may be used for object and pedestrian detection, emergency braking, collision avoidance, and/or other functions. The LIDAR sensor(s) 564 may be functional safety level ASIL B. In some examples, the vehicle 500 may include multiple LIDAR sensors 564 (e.g., two, four, six, etc.) that may use Ethernet (e.g., to provide data to a Gigabit Ethernet switch).

In some examples, the LIDAR sensor(s) 564 may be capable of providing a list of objects and their distances for a 360-degree field of view. Commercially available LIDAR sensor(s) 564 may have an advertised range of approximately 500 m, with an accuracy of 2 cm-3 cm, and with support for a 500 Mbps Ethernet connection, for example. In some examples, one or more non-protruding LIDAR sensors 564 may be used. In such examples, the LIDAR sensor(s) 564 may be implemented as a small device that may be embedded into the front, rear, sides, and/or corners of the vehicle 500. The LIDAR sensor(s) 564, in such examples, may provide up to a 520-degree horizontal and 35-degree vertical field-of-view, with a 200 m range even for low-reflectivity objects. Front-mounted LIDAR sensor(s) 564 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 500. Available 3D flash LIDAR systems include a solid-state 3D staring array LIDAR camera with no moving parts other than a fan (e.g., a non-scanning LIDAR device). The flash LIDAR device may use a five nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 564 may be less susceptible to motion blur, vibration, and/or shock.

The vehicle may further include IMU sensor(s) 566. The IMU sensor(s) 566 may be located at a center of the rear axle of the vehicle 500, in some examples. The IMU sensor(s) 566 may include, for example and without limitation, an accelerometer(s), a magnetometer(s), a gyroscope(s), a magnetic compass(es), and/or other sensor types. In some examples, such as in six-axis applications, the IMU sensor(s) 566 may include accelerometers and gyroscopes, while in nine-axis applications, the IMU sensor(s) 566 may include accelerometers, gyroscopes, and magnetometers.

In some embodiments, the IMU sensor(s) 566 may be implemented as a miniature, high-performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 566 may enable the vehicle 500 to estimate heading without requiring input from a magnetic sensor by directly observing and correlating the changes in velocity from GPS to the IMU sensor(s) 566. In some examples, the IMU sensor(s) 566 and the GNSS sensor(s) 558 may be combined in a single integrated unit.

The vehicle may include microphone(s) 596 placed in and/or around the vehicle 500. The microphone(s) 596 may be used for emergency vehicle detection and identification, among other things.

The vehicle may further include any number of camera types, including stereo camera(s) 568, wide-view camera(s) 570, infrared camera(s) 572, surround camera(s) 574, long-range and/or mid-range camera(s) 598, and/or other camera types. The cameras may be used to capture image data around an entire periphery of the vehicle 500. The types of cameras used depends on the embodiments and requirements for the vehicle 500, and any combination of camera types may be used to provide the necessary coverage around the vehicle 500. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 5A and FIG.

The vehicle 500 may further include vibration sensor(s) 542. The vibration sensor(s) 542 may measure vibrations of components of the vehicle, such as the axle(s). For example, changes in vibrations may indicate a change in road surfaces. In another example, when two or more vibration sensors 542 are used, the differences between the vibrations may be used to determine friction or slippage of the road surface (e.g., when the difference in vibration is between a power-driven axle and a freely rotating axle).

The vehicle 500 may include an ADAS system 538. The ADAS system 538 may include an SoC, in some examples. The ADAS system 538 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 560, LIDAR sensor(s) 564, and/or a camera(s). The ACC systems may include longitudinal ACC and/or lateral ACC. Longitudinal ACC monitors and controls the distance to the vehicle immediately ahead of the vehicle 500 and automatically adjusts the vehicle speed to maintain a safe distance from vehicles ahead. Lateral ACC performs distance keeping, and advises the vehicle 500 to change lanes when necessary. Lateral ACC is related to other ADAS applications such as LC and CWS.

CACC uses information from other vehicles that may be received via the network interface 524 and/or the wireless antenna(s) 526 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication links. In general, the V2V communication concept provides information about the immediately preceding vehicles (e.g., vehicles immediately ahead of and in the same lane as the vehicle 500), while the I2V communication concept provides information about traffic farther ahead. CACC systems may include either or both I2V and V2V information sources. Given the information of the vehicles ahead of the vehicle 500, CACC may be more reliable, and it has potential to improve traffic flow smoothness and reduce congestion on the road.

FCW systems are designed to alert the driver to a hazard, so that the driver may take corrective action. FCW systems use a front-facing camera and/or RADAR sensor(s) 560, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 560, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 500 crosses lane markings. An LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 500 if the vehicle 500 starts to exit the lane.

BSW systems detect and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 560, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 500 is backing up. Some RCTW systems include AEB to ensure that the vehicle brakes are applied to avoid a crash. RCTW systems may use one or more rear-facing RADAR sensor(s) 560, coupled to a dedicated processor, DSP, FPGA, and/or ASIC, that is electrically coupled to driver feedback, such as a display, speaker, and/or vibrating component.

Conventional ADAS systems may be prone to false positive results, which may be annoying and distracting to a driver, but typically are not catastrophic, because the ADAS systems alert the driver and allow the driver to decide whether a safety condition truly exists and act accordingly. However, in an autonomous vehicle 500, the vehicle 500 itself must, in the case of conflicting results, decide whether to heed the result from a primary computer or a secondary computer (e.g., a first controller 536 or a second controller 536). For example, in some embodiments, the ADAS system 538 may be a backup and/or secondary computer for providing perception information to a backup computer rationality module. The backup computer rationality monitor may run a redundant diverse software on hardware components to detect faults in perception and dynamic driving tasks. Outputs from the ADAS system 538 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output can be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 504.

In other examples, ADAS system 538 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity make the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware used by the primary computer is not causing material error.

In some examples, the output of the ADAS system 538 may be fed into the primary computer's perception block and/or the primary computer's dynamic driving task block. For example, if the ADAS system 538 indicates a forward crash warning due to an object immediately ahead, the perception block may use this information when identifying objects. In other examples, the secondary computer may have its own neural network that is trained and thus reduces the risk of false positives, as described herein.

The vehicle 500 may further include the infotainment SoC 530 (e.g., an in-vehicle infotainment system (IVI)). Although illustrated and described as an SoC, the infotainment system may not be a SoC, and may include two or more discrete components. The infotainment SoC 530 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle-related information such as fuel level, total distance covered, brake fuel level, oil level, door open/close, air filter information, etc.) to the vehicle 500. For example, the infotainment SoC 530 may include radios, disk players, navigation systems, video players, USB and Bluetooth connectivity, carputers, in-car entertainment, Wi-Fi, steering wheel audio controls, hands-free voice control, a heads-up display (HUD), an HMI display 534, a telematics device, a control panel (e.g., for controlling and/or interacting with various components, features, and/or systems), and/or other components. The infotainment SoC 530 may further be used to provide information (e.g., visual and/or audible) to a user(s) of the vehicle, such as information from the ADAS system 538, autonomous driving information such as planned vehicle maneuvers, trajectories, surrounding environment information (e.g., intersection information, vehicle information, road information, etc.), and/or other information.

The infotainment SoC 530 may include GPU functionality. The infotainment SoC 530 may communicate over the bus 502 (e.g., CAN bus, Ethernet, etc.) with other devices, systems, and/or components of the vehicle 500. In some examples, the infotainment SoC 530 may be coupled to a supervisory MCU such that the GPU of the infotainment system may perform some self-driving functions in the event that the primary controller(s) 536 (e.g., the primary and/or backup computers of the vehicle 500) fail. In such an example, the infotainment SoC 530 may put the vehicle 500 into a chauffeur to safe-stop mode, as described herein.

The vehicle 500 may further include an instrument cluster 532 (e.g., a digital dash, an electronic instrument cluster, a digital instrument panel, etc.). The instrument cluster 532 may include a controller and/or supercomputer (e.g., a discrete controller or supercomputer). The instrument cluster 532 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 530 and the instrument cluster 532. In other words, the instrument cluster 532 may be included as part of the infotainment SoC 530, or vice versa.

Figure 5D:
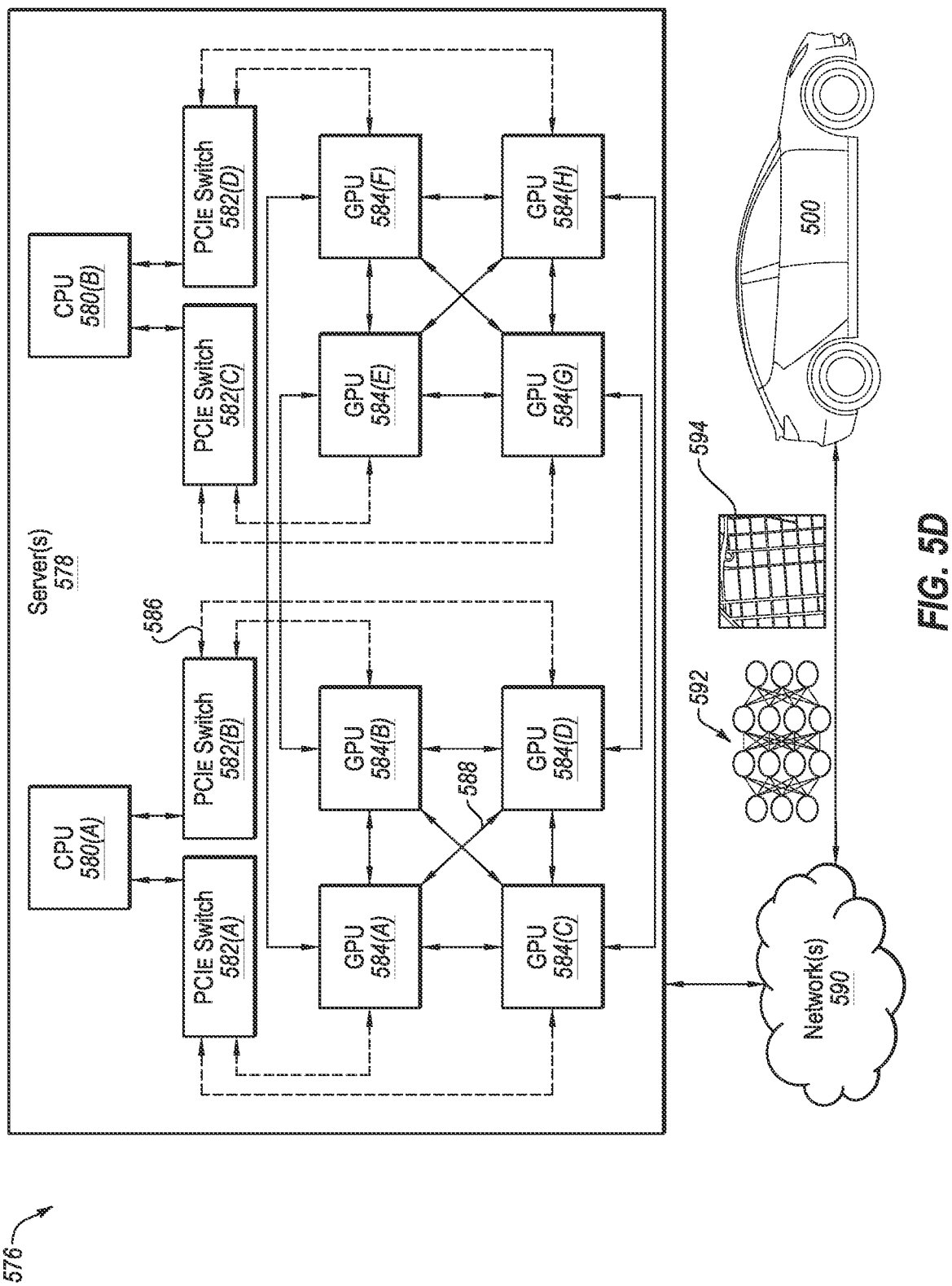
FIG. 5D is a system diagram for communication between cloud-based server(s) and the example autonomous vehicle of FIG. 5A, in accordance with some embodiments of the present disclosure.

FIG. 5D is a system diagram for communication between cloud-based server(s) and the example autonomous vehicle 500 of FIG. 5A, in accordance with some embodiments of the present disclosure. The system 576 may include server(s) 578, network(s) 590, and vehicles, including the vehicle 500. The server(s) 578 may include a plurality of GPUs 584(A)-584(H) (collectively referred to herein as GPUs 584), PCIe switches 582(A)-582(H) (collectively referred to herein as PCIe switches 582), and/or CPUs 580(A)-580(B) (collectively referred to herein as CPUs 580). The GPUs 584, the CPUs 580, and the PCIe switches may be interconnected with high-speed interconnects such as, for example and without limitation, NVLink interfaces 588 developed by NVIDIA and/or PCIe connections 586. In some examples, the GPUs 584 are connected via NVLink and/or NVSwitch SoC and the GPUs 584 and the PCIe switches 582 are connected via PCIe interconnects. Although eight GPUs 584, two CPUs 580, and two PCIe switches are illustrated, this is not intended to be limiting. Depending on the embodiment, each of the server(s) 578 may include any number of GPUs 584, CPUs 580, and/or PCIe switches. For example, the server(s) 578 may each include eight, sixteen, thirty-two, and/or more GPUs 584.

The server(s) 578 may receive, over the network(s) 590 and from the vehicles, image data representative of images showing unexpected or changed road conditions, such as recently commenced roadwork. The server(s) 578 may transmit, over the network(s) 590 and to the vehicles, neural networks 592, updated neural networks 592, and/or map information 594, including information regarding traffic and road conditions. The updates to the map information 594 may include updates for the HD map 522, such as information regarding construction sites, potholes, detours, flooding, and/or other obstructions. In some examples, the neural networks 592, the updated neural networks 592, and/or the map information 594 may have resulted from new training and/or experiences represented in data received from any number of vehicles in the environment, and/or based on training performed at a datacenter (e.g., using the server(s) 578 and/or other servers).

The server(s) 578 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 590, and/or the machine learning models may be used by the server(s) 578 to remotely monitor the vehicles.

In some examples, the server(s) 578 may receive data from the vehicles and apply the data to up-to-date real-time neural networks for real-time intelligent inferencing. The server(s) 578 may include deep-learning supercomputers and/or dedicated AI computers powered by GPU(s) 584, such as a DGX and DGX Station machines developed by NVIDIA. However, in some examples, the server(s) 578 may include deep learning infrastructure that use only CPU-powered datacenters.

The deep-learning infrastructure of the server(s) 578 may be capable of fast, real-time inferencing, and may use that capability to evaluate and verify the health of the processors, software, and/or associated hardware in the vehicle 500. For example, the deep-learning infrastructure may receive periodic updates from the vehicle 500, such as a sequence of images and/or objects that the vehicle 500 has located in that sequence of images (e.g., via computer vision and/or other machine learning object classification techniques). The deep-learning infrastructure may run its own neural network to identify the objects and compare them with the objects identified by the vehicle 500 and, if the results do not match and the infrastructure concludes that the AI in the vehicle 500 is malfunctioning, the server(s) 578 may transmit a signal to the vehicle 500 instructing a fail-safe computer of the vehicle 500 to assume control, notify the passengers, and complete a safe parking maneuver.

For inferencing, the server(s) 578 may include the GPU(s) 584 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 6:
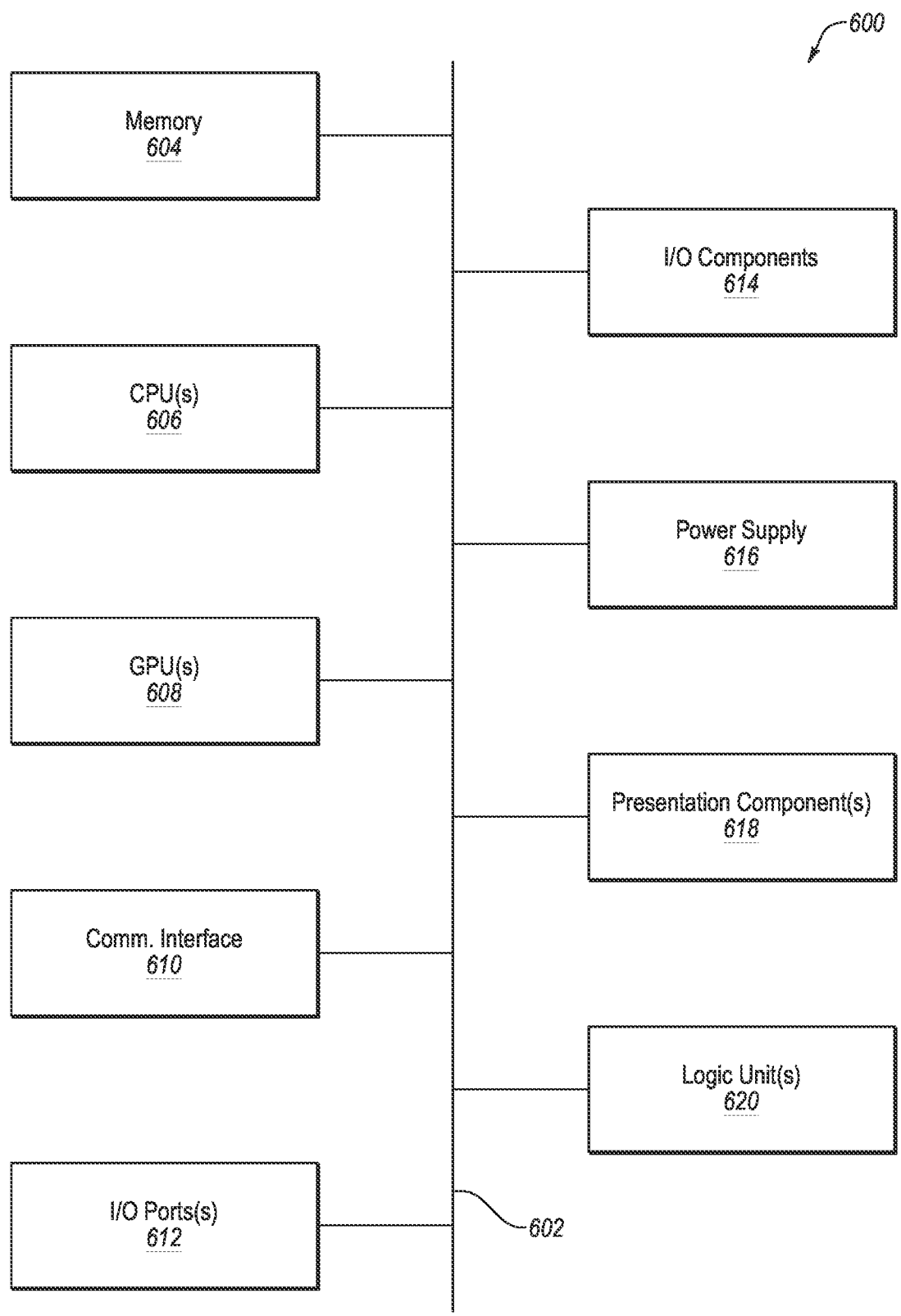
FIG. 6 is a block diagram of an example computing device suitable for use in implementing some embodiments of the present disclosure.

FIG. 6 is a block diagram of an example computing device(s) 600 suitable for use in implementing some embodiments of the present disclosure. Computing device 600 may include an interconnect system 602 that directly or indirectly couples the following devices: memory 604, one or more central processing units (CPUs) 606, one or more graphics processing units (GPUs) 608, a communication interface 610, I/O ports 612, input/output components 614, a power supply 616, one or more presentation components 618 (e.g., display(s)), and one or more logic units 620.

Although the various blocks of FIG. 6 are shown as connected via the interconnect system 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," "augmented reality system," and/or other device or system types, as all are contemplated within the scope of the computing device of FIG. 6.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point, connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608.

Examples of the logic unit(s) 620 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), I/O elements, peripheral component interconnect (PCI) or peripheral component interconnect express (PCIe) elements, and/or the like.

The communication interface 610 may include one or more receivers, transmitters, and/or transceivers that enable the computing device 600 to communicate with other computing devices via an electronic communication network, including wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 612 may enable the computing device 600 to be logically coupled to other devices including the I/O components 614, the presentation component(s) 618, and/or other components, some of which may be built into (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, etc.), and output the data (e.g., as an image, video, sound, etc.).

Example Data Center

Figure 7:
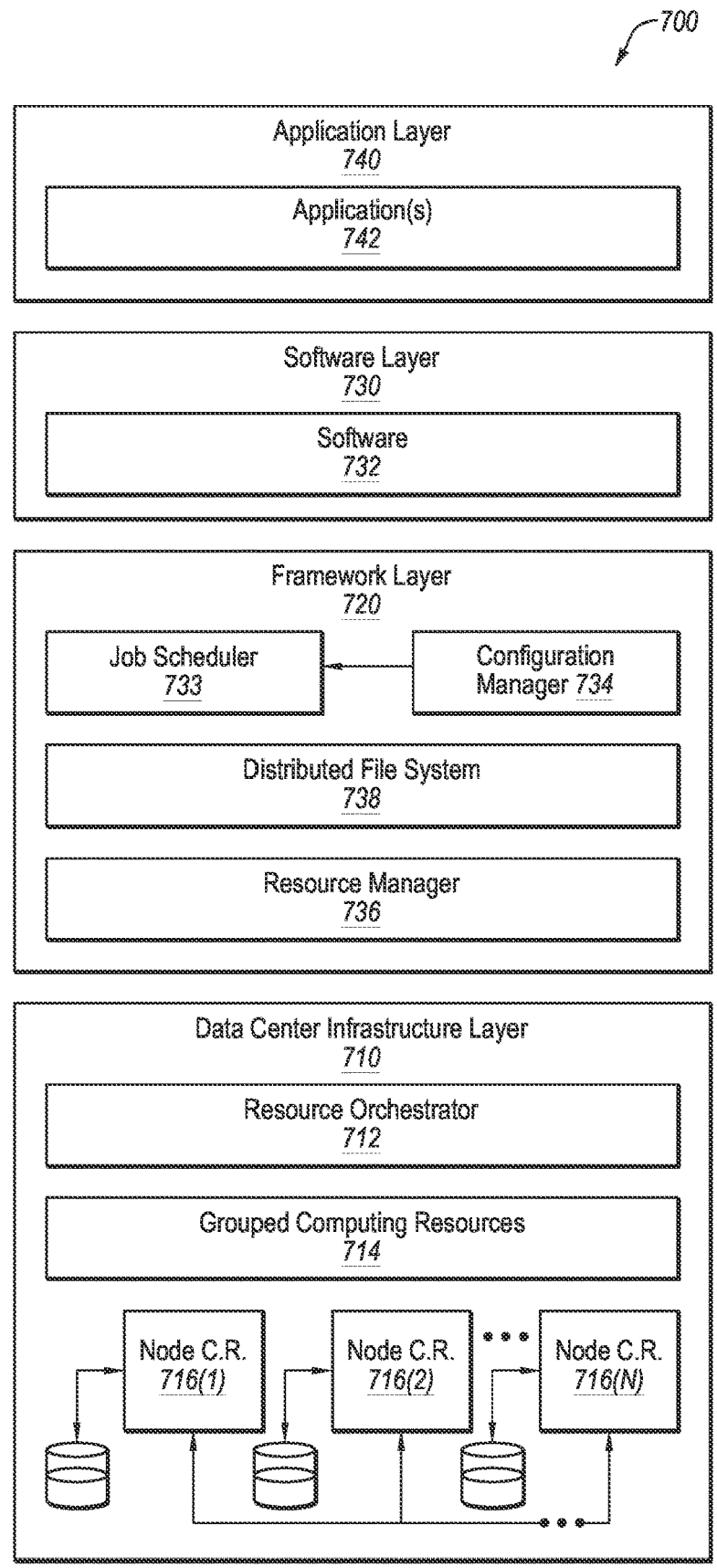
FIG. 7 is a block diagram of an example data center suitable for use in implementing some embodiments of the present disclosure.

FIG. 7 illustrates an example data center 700 that may be used in at least one embodiments of the present disclosure. The data center 700 may include a data center infrastructure layer 710, a framework layer 720, a software layer 730, and/or an application layer 740.

As shown in FIG. 7, the data center infrastructure layer 710 may include a resource orchestrator 712, grouped computing resources 714, and node computing resources ("node C.R.s") 716(1) 716(N), where "N" represents any whole, positive integer. In at least one embodiment, node C.R.s 716(1) 716(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 716(1) 716(N) may correspond to a server having one or more of the above-mentioned computing resources. In addition, in some embodiments, the node C.R.s 716(1) 716(N) may include one or more virtual components, such as vGPUs, vCPUs, and/or the like, and/or one or more of the node C.R.s 716(1) 716(N) may correspond to a virtual machine (VM).

In at least one embodiment, grouped computing resources 714 may include separate groupings of node C.R.s 716 housed within one or more racks (not shown), or many racks housed in data centers at various geographical locations (also not shown). Separate groupings of node C.R.s 716 within grouped computing resources 714 may include grouped compute, network, memory or storage resources that may be configured or allocated to support one or more workloads. In at least one embodiment, several node C.R.s 716 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 712 may configure or otherwise control one or more node C.R.s 716(1) 716(N) and/or grouped computing resources 714. In at least one embodiment, resource orchestrator 712 may include a software design infrastructure (SDI) management entity for the data center 700. The resource orchestrator 712 may include hardware, software, or some combination thereof.

In at least one embodiment, as shown in FIG. 7, framework layer 720 may include a job scheduler 733, a configuration manager 734, a resource manager 736, and/or a distributed file system 738. The framework layer 720 may include a framework to support software 732 of software layer 730 and/or one or more application(s) 742 of application layer 740. The software 732 or application(s) 742 may respectively include web-based service software or applications, such as those provided by Amazon Web Services, Google Cloud and Microsoft Azure. The framework layer 720 may be, but is not limited to, a type of free and open-source software web application framework such as Apache Spark™ (hereinafter "Spark") that may use distributed file system 738 for large-scale data processing (e.g., "big data"). In at least one embodiment, job scheduler 733 may include a Spark driver to facilitate scheduling of workloads supported by various layers of data center 700. The configuration manager 734 may be capable of configuring different layers such as software layer 730 and framework layer 720 including Spark and distributed file system 738 for supporting large-scale data processing. The resource manager 736 may be capable of managing clustered or grouped computing resources mapped to or allocated for support of distributed file system 738 and job scheduler 733. In at least one embodiment, clustered or grouped computing resources may include grouped computing resource 714 at data center infrastructure layer 710. The resource manager 736 may coordinate with resource orchestrator 712 to manage these mapped or allocated computing resources.

In at least one embodiment, software 732 included in software layer 730 may include software used by at least portions of node C.R.s 716(1) 716(N), grouped computing resources 714, and/or distributed file system 738 of framework layer 720. One or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1) 716(N), grouped computing resources 714, and/or distributed file system 738 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 734, resource manager 736, and resource orchestrator 712 may implement any number and type of self-modifying actions based on any amount and type of data acquired in any technically feasible fashion. Self-modifying actions may relieve a data center operator of data center 700 from making possibly bad configuration decisions and possibly avoiding underused and/or poor performing portions of a data center.

The data center 700 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 700. In at least one embodiment, trained or deployed machine learning models corresponding to one or more neural networks may be used to infer or predict information using resources described above with respect to the data center 700 by using weight parameters calculated through one or more training techniques, such as but not limited to those described herein.

In at least one embodiment, the data center 700 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 600 of FIG. 6—e.g., each device may include similar components, features, and/or functionality of the computing device(s) 600. In addition, where backend devices (e.g., servers, NAS, etc.) are implemented, the backend devices may be included as part of a data center 700, an example of which is described in more detail herein with respect to FIG. 7.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 600 described herein with respect to FIG. 6. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to codes that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
    receiving, by a first component, first data transmitted from a second component via a first data lane and second data transmitted from the second component via a second data lane, the first data and the second data being transmitted during a first time period;
    receiving, by the first component and at an interval of time, one or more de-skew symbols transmitted from the second component during the first time period via at least one of the first data lane or the second data lane, a magnitude of the interval of time being based at least on at least one of:
        an expected first skew introduced to a first transmission via the first data lane: or
        an expected second skew introduced to a second transmission via the second data lane; and
    compensating, based at least in part on the one or more de-skew symbols, for at least one of a first skew introduced during transmission of the first data via the first data lane or a second skew introduced during transmission of the second data via the second data lane.

2. The method of claim 1, further comprising:
    receiving, using the first component, one or more initial symbols transmitted using the second component via at least one of the first data lane or the second data lane, the one or more initial symbols being transmitted during a second time period prior to the first time period; and
    compensating, based at least in part on the one or more initial symbols for at least one of a first initial skew associated with transmission of data via the first data lane or a second initial skew associated with transmission of data via the second data lane.

3. The method of claim 1, wherein the first time period includes one or more run-time transmissions between the first component and the second component.

4. The method of claim 1, wherein the expected first skew is based at least on at least one of temperature, noise, or passage of time.

5. The method of claim 1, wherein the interval of time is further based at least on feedback from the first component.

6. The method of claim 1, wherein the interval of time is at least one of predetermined by a user or periodic.

7. The method of claim 1, wherein the compensating for the first skew includes adjusting a sampling period of the first component relative to the first data received via the first data lane.

8. The method of claim 1, wherein at least one de-skew symbol of the one or more de-skew symbols is represented using one or more bits of data.

9. A system comprising:
one or more processing units to:
receive, during a first time period and from a component, first data transmitted via a first data lane and second data transmitted via a second data lane;
receive, during the first time period and from the component at a periodic interval, one or more de-skew symbols via at least one of the first data lane or the second data lane, the periodic interval being based at least on feedback from the system, the periodic interval being based at least on one or more of:
a first skew introduced during transmission of the first data via the first data lane;
a second skew introduced during transmission of the second data via the second data lane;
an expected first skew introduced to one or more transmissions via the first data lane; or
an expected second skew introduced to one or more transmissions via the second data lane; and
compensate, based at least in part on the one or more de-skew symbols, for at least one of the first skew or the second skew.

10. The system of claim 9, wherein the one or more processing units are further to:
receive, during a second time period, one or more initial symbols from the component via at least one of the first data lane or the second data lane; and
compensate, based at least in part on the one or more initial symbols, for a first initial skew associated with transmission of data via the first data lane or a second initial skew associated with transmission of data via the second data lane.

11. The system of claim 10, wherein at least one of the first initial skew is based at least in part on one or more first physical characteristics of the first data lane or the second initial skew is based at least in part on one or more second physical characteristics of the second data lane.

12. The system of claim 9, wherein at least one of the expected first skew or the expected second skew is based at least in part on at least one of temperature, noise, or passage of time.

13. The system of claim 9, wherein the system comprises one or more of:
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system implemented using an edge device;
a system implemented using a robot;
a system for performing conversational AI operations;
a system for generating synthetic data;
a system incorporating one or more virtual machines (VMs);
a system implemented at least partially in a data center; or
a system implemented at least partially using cloud computing resources.

14. A processor comprising:
one or more processing units to:
initiate a counter corresponding to an interval of time, the interval of time being determined based at least in part on an effect of one or more external stimuli on transmission of data via at least one of a first data lane or a second data lane;
prior to expiration of the counter, transmit first data to a component via the first data lane and second data to the component via the second data lane;
upon expiration of the counter, transmit one or more de-skew symbols to the component via at least one of the first data lane or the second data lane to cause the component to compensate for skew introduced in at least one of the first data lane or the second data lane; and
reset the counter based at least in part on the one or more de-skew symbols being transmitted.

15. The processor of claim 14, wherein the one or more processing units are further to:
prior to the initiation of the counter, transmit one or more initial symbols to the component via at least one of the first data lane or the second data lane.

16. The processor of claim 14, wherein at least one de-skew symbol of the one or more de-skew symbol is represented using one or more first bits indicating a start of the at least one de-skew symbol, one or more second bits corresponding to the at least one de-skew symbol, and one or more third bits indicating an end of the at least one de-skew symbol.

17. The processor of claim 14, wherein the effect of the one or more external stimuli is determined based at least in part on at least one of an expected change in the transmission of data, an estimated change in the transmission of data, or an observed change in the transmission of data.

18. The processor of claim 14, wherein the processor is comprised in at least one of:
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system implemented using an edge device;
a system implemented using a robot;
a system for performing conversational AI operations;
a system for generating synthetic data;
a system incorporating one or more virtual machines (VMs);
a system implemented at least partially in a data center; or
a system implemented at least partially using cloud computing resources.

* * * * *